US012251928B2

(12) United States Patent
Sugimoto

(10) Patent No.: US 12,251,928 B2
(45) Date of Patent: Mar. 18, 2025

(54) PRINTING DEVICE SETTING PRINTING AREA, ANCHOR AREA, AND ADHESIVE AREA IN TAPE FOR PERFORMING HALF CUT AT BOUNDARIES THEREBETWEEN

(71) Applicant: BROTHER KOGYO KABUSHIKI KAISHA, Nagoya (JP)

(72) Inventor: Kiyoshi Sugimoto, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 88 days.

(21) Appl. No.: 17/932,195

(22) Filed: Sep. 14, 2022

(65) Prior Publication Data

US 2023/0106810 A1 Apr. 6, 2023

(30) Foreign Application Priority Data

Sep. 30, 2021 (JP) ................................ 2021-161428
Sep. 30, 2021 (JP) ................................ 2021-161437

(51) Int. Cl.
*B41J 11/66* (2006.01)

(52) U.S. Cl.
CPC .................................. *B41J 11/663* (2013.01)

(58) Field of Classification Search
CPC ........ B41J 3/4075; B41J 11/666; B41J 11/663
See application file for complete search history.

(56) References Cited

U.S. PATENT DOCUMENTS 6,648,532 B2 * 11/2003 Furuya .................. B41J 11/666 400/621
2002/0090243 A1 * 7/2002 Hosokawa ............ B41J 3/4075 400/613
2004/0208682 A1 10/2004 Akaiwa et al.

FOREIGN PATENT DOCUMENTS

JP 2004216833 A * 8/2004 ........... B41J 11/003
JP 2006-264030 A 10/2006
JP 2011-524154 A 8/2011
JP 2020-160215 A 10/2020
JP 2021-74962 A 5/2021
WO 2009/137756 A1 11/2009

OTHER PUBLICATIONS

Akaiwa, MachineTranslationofJP-2004216833-A, 2004 (Year: 2004).*

* cited by examiner

*Primary Examiner* — Scott A Richmond
(74) *Attorney, Agent, or Firm* — KENEALY VAIDYA LLP

(57) ABSTRACT

In a printing device, a controller performs at least one of a first area setting process and a second area setting process to set an anchor area and adhesive area next to two ends of a printing area based on an acquired length of an object. In the first area setting process the adhesive area is set to have a length to be a lamination length. In the second area setting process the printing area is set to have a length to be larger than or equal to the acquired length. The controller controls a cutter to perform the half cut to cut across the tape at a boundary between the printing area and the anchor area, and at a boundary between the printing area and the adhesive area, and to perform a full cut at one of ends of the anchor area and the adhesive area.

18 Claims, 13 Drawing Sheets

PRINTING DEVICE SETTING PRINTING AREA, ANCHOR AREA, AND ADHESIVE AREA IN TAPE FOR PERFORMING HALF CUT AT BOUNDARIES THEREBETWEEN

REFERENCE TO RELATED APPLICATIONS

This application claims priorities from Japanese Patent Applications No. 2021-161428 filed Sep. 30, 2021 and No. 2021-161437 filed Sep. 30, 2021. The entire contents of the priority applications are incorporated herein by reference.

BACKGROUND ART

Conventionally, labels that are wrapped around and attached to cables have had a printing area, and a transparent area for laminating the printing area. The label includes a transparent film having a first adhesive area, an adhesive-free smooth area, and a second adhesive area. When wrapping the transparent film around a cable in the order of the first adhesive area, the adhesive-free smooth area, and the second adhesive area, the first adhesive area is affixed to a circumferential portion of the cable. The adhesive-free smooth area is then wrapped around the entire circumference of the cable without adhering to the cable. Lastly, the second adhesive area is wrapped around the entire circumference of the cable while being affixed to the adhesive-free smooth area. When the transparent film wrapped around the cable is rotated, perforations in the film are torn so that the first adhesive area separates from the adhesive-free smooth area and the second adhesive area. This allows the label including the adhesive-free smooth area and the second adhesive area to rotate around the cable.

DESCRIPTION

The conventional label described above is suitable for use with cables having a specific diameter. Therefore, when creating labels to be attached to cables having a plurality of different diameters, the user must prepare different types of labels for the different diameters of cables.

In view of the foregoing, it is an object of the present disclosure to provide a printing device, a print data generation program, and a label creating method for creating self-laminating labels to be wrapped around objects by using the same tape, regardless the circumference of the object.

It is another object of the present disclosure to provide a printing device, a print data generation program, and a label creating method for creating labels by using the same tape having a base material and a release material so that the base material can be separated at a desired part thereof or the release material can be released from the base material at a desired part thereof.

In order to attain the above and other object, the present disclosure provides a printing device. The printing device includes a print head, a conveyer, a cutter, and a controller. The print head is configured to print an image on a base material. The conveyer is configured to convey in a conveying direction a tape in which a release material and the base material are bonded together. The cutter is configured to perform: a half cut to cut through the release material but not the base material; and a full cut to cut through both the base material and the release material. The controller is configured to control the print head, the conveyer and the cutter. The controller is configured to further perform, as a main process: a length acquisition process to acquire an outer circumferential length of an object around which a label cut from the tape is to be wrapped; an image acquisition process to acquire the image to be printed; at least one of a first area setting process and a second area setting process, both the first area setting process and the second area setting process setting a printing area, an anchor area, and an adhesive area in the tape on the basis of the acquired length, the image being to be printed in the printing area, the anchor area being next to the printing area on one side of upstream side and downstream side in the conveying direction, the adhesive area being next to the printing area on a remaining one side of upstream side and downstream side in the conveying direction, wherein in the first area setting process the adhesive area is set to have a length in the conveying direction to be equal to a lamination length, and the lamination length is set to be larger than or equal to a sum of: a difference obtained by subtracting the length of the printing area in the conveying direction from the acquired outer circumferential length; and a length from an end of the printing area on the one side in the conveying direction to an end of the image to be printed on the remaining side in the conveying direction, wherein in the second area setting process the printing area is set to have a length in the conveying direction to be larger than or equal to the acquired outer circumferential length; a printing process to control the print head and the conveyer to print the image in the printing area; a first half cut process to control the cutter to perform the half cut to cut across the tape in a width direction thereof at a boundary between the printing area and the anchor area; a second half cut process to control the cutter to perform the half cut to cut across the tape in the width direction at a boundary between the printing area and the adhesive area; and a full cut process to control the cutter to perform the full cut at one of an end of the anchor area on the one side in the conveying direction and an end of the adhesive area on the remaining side in the conveying direction.

According to another aspect, the disclosure provides a non-transitory computer readable storage medium storing a set of program instructions installed on and executed by a computer for generating print data to be printed in a printing device including: a print head configured to print an image on a base material; a conveyer configured to convey in a conveying direction a tape in which a release material and the base material are bonded together; and a cutter configured to perform: a half cut to cut through the release material but not the base material; and a full cut to cut through both the base material and the release material. The set of program instructions includes: a length acquisition process to acquire an outer circumferential length of an object around which a label cut from the tape is to be wrapped; an image acquisition process to acquire the image to be printed; at least one of a first area setting process and a second area setting process, both the first area setting process and the second area setting process setting a printing area, an anchor area, and an adhesive area in the tape on the basis of the acquired length, the image being to be printed in the printing area, the anchor area being next to the printing area on one side of upstream side and downstream side in the conveying direction, the adhesive area being next to the printing area on a remaining one side of upstream side and downstream side in the conveying direction, wherein in the first area setting process the adhesive area is set to have a length in the conveying direction to be equal to a lamination length, and the lamination length is set to be larger than or equal to a sum of: a difference obtained by subtracting the length of the printing area in the conveying direction from the acquired outer circumferential length; and a length from an end of the printing area on the one side in the conveying direction to an end of the image to be printed on the remaining side in the conveying direction, wherein in the second area setting process the printing area is set to have a length in the conveying direction to be larger than or equal to the acquired outer circumferential length; a first half cut setting process to set a first half cut position to a boundary between the printing area and the anchor area, at the first half cut position the half cut is performed to cut across the tape in a width direction thereof; a second half cut setting process to set a second half cut position to a boundary between the printing area and the adhesive area, at the second half cut position the half cut is performed to cut across the tape in the width direction; a full cut setting process to set the full cut position to one of an end of the anchor area on the one side in the conveying direction and an end of the adhesive area on the remaining side in the conveying direction, at the full cut position the full cut is performed; and a generation process to generate the print data including image data to be printed in the printing area, data on the first half cut position, data on the second half cut position, and the data on the full cut position.

According to another aspect, the disclosure provides a method. The method includes: a length acquisition step to acquire an outer circumferential length of an object around which a label cut from a tape is to be wrapped, the tape having a base material and a release material bonded to the base material; an image acquisition step to acquire the image to be printed; at least one of a first area setting step and a second area setting step, both the first area setting step and the second area setting step setting a printing area, an anchor area, and an adhesive area in the tape on the basis of the acquired length, the image being to be printed in the printing area, the anchor area being next to the printing area on one side of upstream side and downstream side in the conveying direction, the adhesive area being next to the printing area on a remaining one side of upstream side and downstream side in the conveying direction, wherein in the first area setting step the adhesive area is set to have a length in the conveying direction to be equal to a lamination length, and the lamination length is set to be larger than or equal to a sum of: a difference obtained by subtracting the length of the printing area in the conveying direction from the acquired outer circumferential length; and a length from an end of the printing area on the one side in the conveying direction to an end of the image to be printed on the remaining side in the conveying direction, wherein in the second area setting step the printing area is set to have a length in the conveying direction to be larger than or equal to the acquired outer circumferential length; a printing step to print the image in the printing area; a first half cut step to perform a half cut to cut across the tape in a width direction thereof at a boundary between the printing area and the anchor area to cut through the release material but not the base material; a second half cut step to perform the half cut to cut across the tape in the width direction at a boundary between the printing area and the adhesive area to cut through the release material but not the base material; and a full cut step to perform a full cut at one of an end of the anchor area on the one side in the conveying direction and an end of the adhesive area on the remaining side in the conveying direction to cut through both the base material and the release material at a position where the full cut is performed.

According to another aspect, the disclosure provides a printing device. The printing device includes a print head, a conveyer, and a cutter. The print head is configured to print an image on a base material. The conveyer is configured to convey in a conveying direction a tape in which a release material and the base material are bonded together. The cutter is configured to perform a half cut to cut through the release material but not the base material. The cutter performs the half cut to cut across the tape in a width direction thereof to a depth from the release material to a part of the base material in the thickness direction.

With the above structures, Self-laminating labels to be wrapped around objects can be created by using the same tape regardless the circumference of the object, or labels capable of rotating around objects can be created by using the same tape regardless the circumference of the object.

Figure 1:
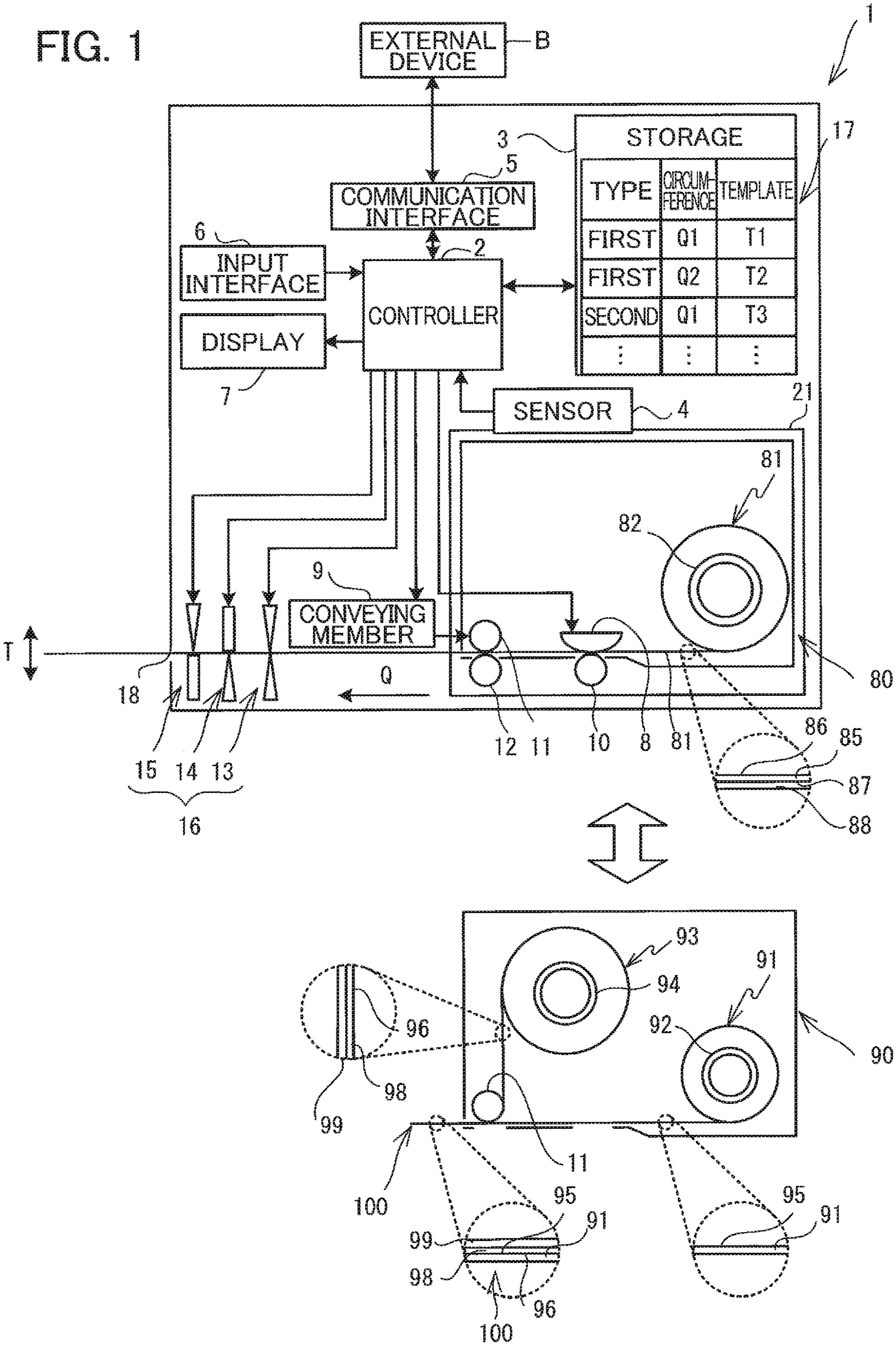
FIG. 1 is an explanatory diagram for a printing device.

A printing device 1 according to embodiments of the present disclosure will be described while referring to the accompanying drawings. The drawings are provided to describe technical features that may be employed by the present disclosure. In other words, the configurations and control of the device described in the drawings are not intended to be limited thereto but are merely illustrative examples.

As shown in FIG. 1, the printing device 1 according to a first embodiment is a thermal transfer printer capable of printing characters (objects such as alphabetic characters, symbols, numbers, and figures) on a tape, which is configured of a long continuous print medium. The printing device 1 is capable of printing on the continuous tape based on print data generated on the printing device 1 or print data acquired from an external device B.

The printing device 1 is provided with a controller 2, a storage 3, a communication interface 5, a cassette mount part 21, a sensor 4, a conveying member 9, a printing member 8, a cutting member 16, an input interface 6, and a display 7. The storage 3, the communication interface 5, the sensor 4, the conveying member 9, the printing member 8, the cutting member 16, the input interface 6, and the display 7 are all electrically connected to the controller 2.

The storage 3 includes ROM, RAM, flash memory, and the like, for example. The storage 3 stores various programs and the like required for controlling the printing device 1. The controller 2 performs various operations based on these programs. Dot pattern data for printing various characters, sorted by format and size, is stored in the storage 3 in association with code data. The storage 3 is provided with a plurality of storage areas, such as a text memory and a print buffer. The text memory stores data to be printed. The print buffer stores dot patterns to be printed. Other storage areas of the storage 3 store a table 17, various calculation data, and the like.

The table 17 stores a plurality of templates corresponding to types of cassettes that are mountable in the printing device 1, and different circumferential lengths of cables C to which labels are to be affixed. Here, the circumferential length of the cable C is a length in the circumference direction of the cable C. In the present embodiment, the table 17 stores templates T1 through T3. Template T1 is used for a first cassette type to be used when the circumference of the cable C is Q1 mm. Template T2 is used for the first cassette type to be used when the circumference of the cable C is Q2 mm. Template T3 is used for a second cassette type to be used when the circumference of the cable C is Q1 mm.

The communication interface 5 includes a communication module for connecting to a public network. The printing device 1 can send data to and receive data from the external device B via the communication interface 5. The external device B is an information processing device, such as a personal computer, a smartphone, a tablet computer, and the like.

The cassette mount part 21 is a recess in which a cassette accommodating at least a base material is removably mounted. One of a plurality of types of cassettes including cassettes 80 and 90 is selected to be mounted in the cassette mount part 21. Types of cassettes are classified according to the dimension in a width direction W of tape accommodated in the cassette, the color of the base material or release material, the printing color, the tape material, and the like. Here, the width direction W is orthogonal to the conveying direction Q. The cassette 80 is a cassette of the first cassette type and accommodates a tape 81, an ink ribbon (not shown), and the like. The tape 81 is a long (continuous-length) printing medium wound about a spool 82. The tape 81 has a transparent base material 85, and a release material 88. The base material 85 has a printing surface 86, and a back surface 87 opposite the printing surface 86. The release material 88 is bonded to the back surface 87 of the base material 85 with an adhesive layer. In other words, the tape 81 is a single-sided adhesive tape having an adhesive layer formed only on one side of the base material 85. The term "transparent" in this embodiment signifies that one side of the base material 85 in a thickness direction T is visible from the other side. The base material 85 is transparent and may be colorless or colored. The release material 88 is bonded to the adhesive layer. The printing surface 86 on the tape 81 in the first type of cassette 80 is not protected by other tape and remains exposed when a label created by cutting this tape 81 is discharged from the cassette 80.

The cassette 90 is the second or third cassette type and accommodates a base material 91, a tape 93, an ink ribbon (not shown), and the like. The base material 91 is a long, continuous transparent film tape wound about a spool 92. The base material 91 has a printing surface 95. Inside the cassette 90, the tape 93 is bonded to the printing surface 95 of the base material 91 via an adhesive layer 96 after the printing surface 95 has been printed. The tape 93 is a long, continuous tape wound about a spool 94. The tape 93 has a base material 98, and a release material 99. An adhesive material is formed on both sides of the base material 98. The release material 99 is bonded to the base material 98 via one of the adhesive layers. In other words, the tape 93 is a double-sided adhesive tape. The base material 98 in the cassette 90 of the second type is non-transparent. The term "non-transparent" signifies that one side of the base material 98 in the thickness direction T is not visible from the other side. The base material 98 in the cassette 90 of the third type is transparent. The printing surface 95 on the base material 91 is bonded to the tape 93 after printing to form a tape 100. The label created by cutting this tape 100 is discharged from the cassette 90 with the printing surface 95 protected by the tape 93.

The base materials 85, 91, and 98 are formed of a plastic film, such as a polyethylene film, a polyamide film, a polyester film, a polypropylene film, or a polyvinyl chloride film, for example. The base materials 85, 91, and 98 are preferably formed of a vinyl film considering that the labels curve along the outer circumference of the object when wrapped therearound. The release materials 88 and 99 are non-transparent and are formed of glassine paper, wood-free paper, or polyethylene terephthalate (PET) coated with a release agent, such as silicone and polyethylene, for example.

The sensor 4 is a well-known sensor that mechanically detects the type of cassette mounted in the printing device 1 and outputs information indicating the detected type to the controller 2. The printing member 8 prints images on the base material accommodated in the cassette. A roller 10 presses the printing surface of the base material against the printing member 8. The printing member 8 is a thermal head provided with heating elements and prints images on the base material by thermally transferring ink onto the base material. The printing member 8 performs thermal printing when the base material is thermal paper. The conveying member 9 rotates conveying rollers 11 and 12 that nip tape formed of a base material on which the printing member 8 has printed images and a release material bonded to the base material, and conveys the tape in a conveying direction Q. The conveying member 9 is a stepping motor, for example.

The cutting member 16 performs half cuts to cut through the release material but not the base material and full cuts to cut through both the base material and release material. That is, in the half cut, the cutting member 16 cuts the tape so that a part of the release material is separated from a remaining part thereof, but any part of the base material is not separated from a remaining part thereof. The cutting member 16 in the present embodiment is provided with half cutters 14 and 15 that perform the half cuts, and a full cutter 13 that performs the full cuts. The half cutters 14 and 15 and the full cutter 13 are all disposed downstream of the conveying rollers 11 and 12 in the conveying direction Q. The half cutter 14 makes a cut into the tape from the roller 10 side in the direction from the roller 10 toward the printing member 8. The half cutter 15 makes a cut into the tape from the printing member 8 side in the direction from the printing member 8 toward the roller 10.

When the tape is cut by the half cutter 14 or the half cutter 15, the release material is divided into a plurality of pieces in the conveying direction Q that remain affixed to the base material through the adhesive layer. Labels created by cutting tape with the full cutter 13 are discharged from the printing device 1 through an outlet 18. By peeling the release material off any select portion of the label, the user can form an adhesive portion on which the adhesive layer of the base material is exposed while remaining a non-adhesive portion on which the release material remains intact.

The input interface 6 enables the user to input various instructions into the controller 2. The input interface 6 is a touchscreen, for example. The display 7 displays various images.

Next, printing processes performed by the printing device 1 will be described with reference to FIGS. 2 through 8 using specific Examples 1 through 3. Example 1 provides a case in which the first type of cassette 80 is used to create a self-laminating label F to be wrapped around a cable C having a circular circumference with a diameter of K mm. Example 2 provides a case in which the second type of cassette 90 is used to create a laminated label J to be wrapped around a cable C. Example 3 provides a case in which the third type of cassette 90 is used to create a laminated label E to be wrapped around a cable C. The printing device 1 executes a printing process while a cassette 80 or a cassette 90 is mounted in the printing device 1. Although the printing processes in Examples 1 through 3 are executed at different timings from each other, the processes are described below in parallel for simplicity.

When the controller 2 detects an instruction through the input interface 6 to start a printing process, the controller 2 reads the print data generation program for executing the printing process from the storage 3. The controller 2 executes a printing process having the steps described below according to instructions in the print data generation program. Various data acquired during the printing process is stored in the storage 3 as needed. In the following process, “step” is abbreviated as “S” in the step numbers. Since the diameter of K mm for the cable C is sufficiently larger than the thickness of labels created in the printing process, printing processes performed in the present embodiment do not account for the effects of label thickness when wrapping the labels around cables C. The area occupied by an image G printed in the printing process is depicted with a bold line in FIGS. 6 through 8.

Figure 2:
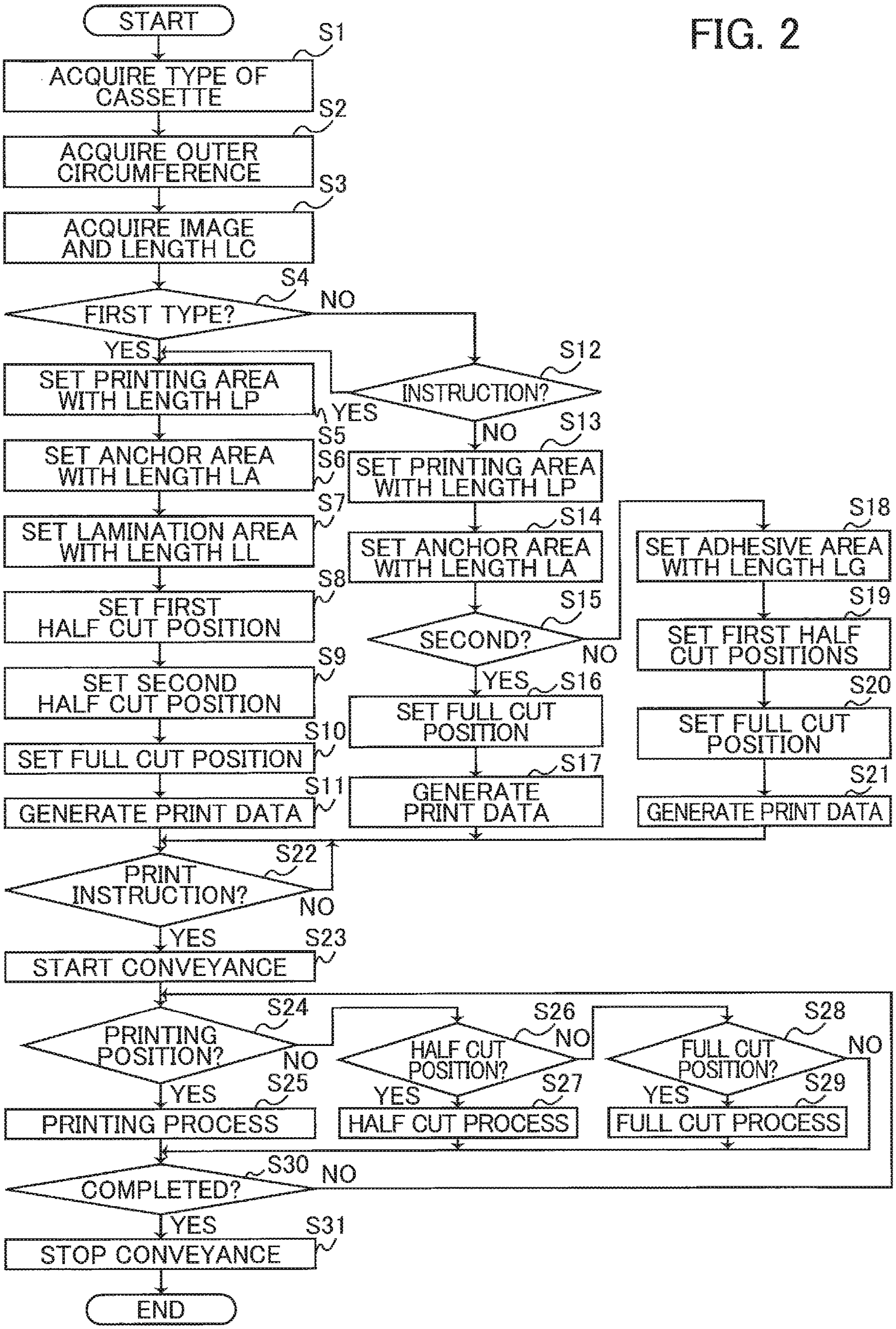
FIG. 2 is a flowchart illustrating a printing process.

As shown in FIG. 2, in S1 the controller 2 acquires the type of cassette mounted in the cassette mount part 21 based on detection results from the sensor 4. The controller 2 acquires the first type of cassette in Example 1, the second type of cassette in Example 2, and the third type of cassette in Example 3.

In S2 the controller 2 acquires an outer circumference M (the length M of the cable C in the circumferential direction) based on the diameter of the cable C around which the label cut from the tape will be wrapped. The method of acquiring the outer circumference M of the cable C may be selected as appropriate. For example, the controller 2 may acquire a value inputted by the user through the input interface 6 as the outer circumference M or may calculate the outer circumference M based on a diameter K inputted by the user via the input interface 6. When the storage 3 stores in advance correlations between types of cables C, such as the product names and model numbers of the cables C, and the outer circumferences M of cables C, the controller 2 may acquire the outer circumference M from the storage 3 corresponding to the type of cable C which is inputted by the user via the input interface 6.

Figure 3:
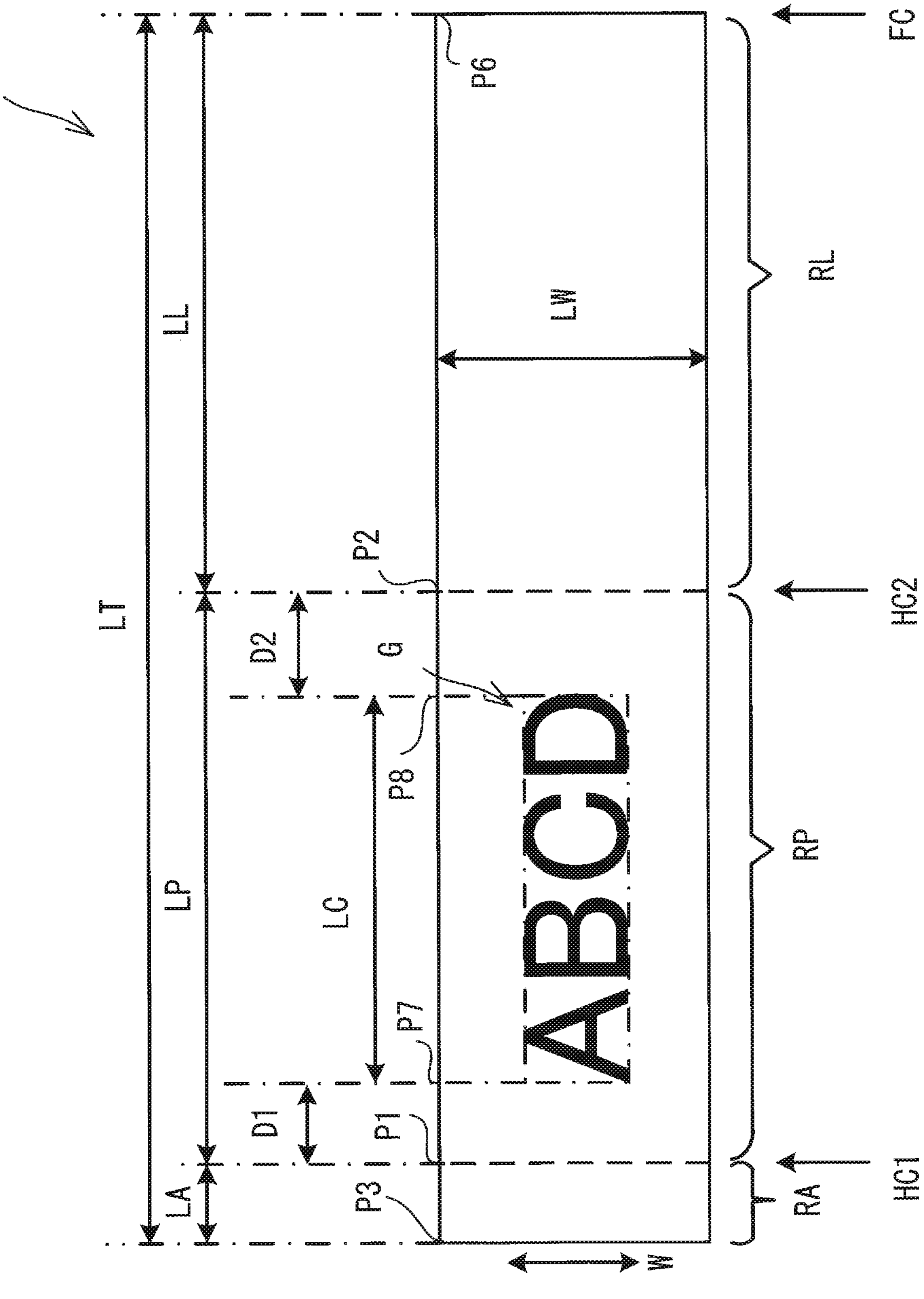
FIG. 3 is an explanatory diagram illustrating a process for setting anchor area, a printing area, a lamination area of a label created when a type of cassette is a first type.
Figure 4:
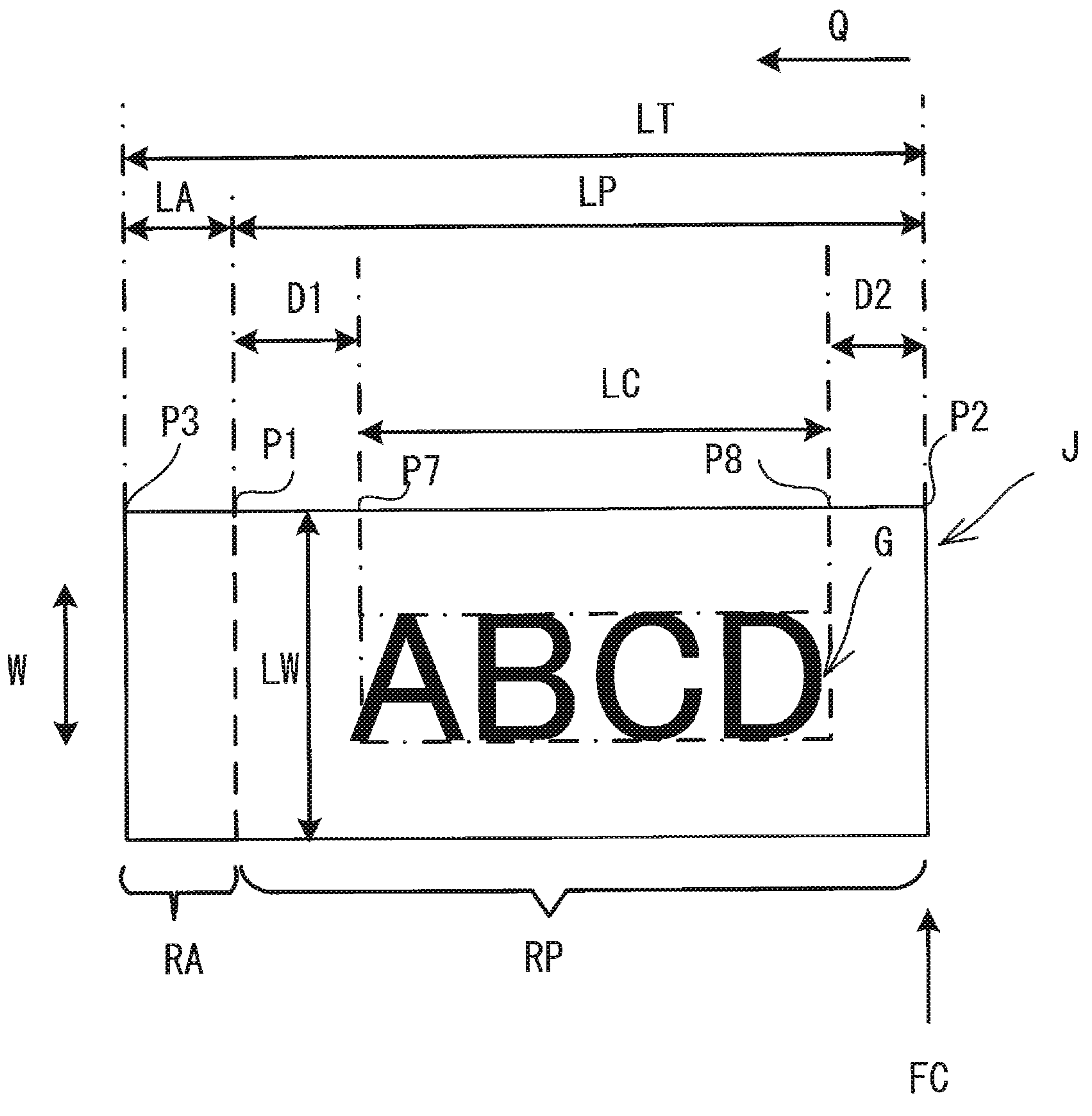
FIG. 4 is an explanatory diagram illustrating a process for setting an anchor area, and a printing area of a label created when the type of cassette is a second type.
Figure 5:
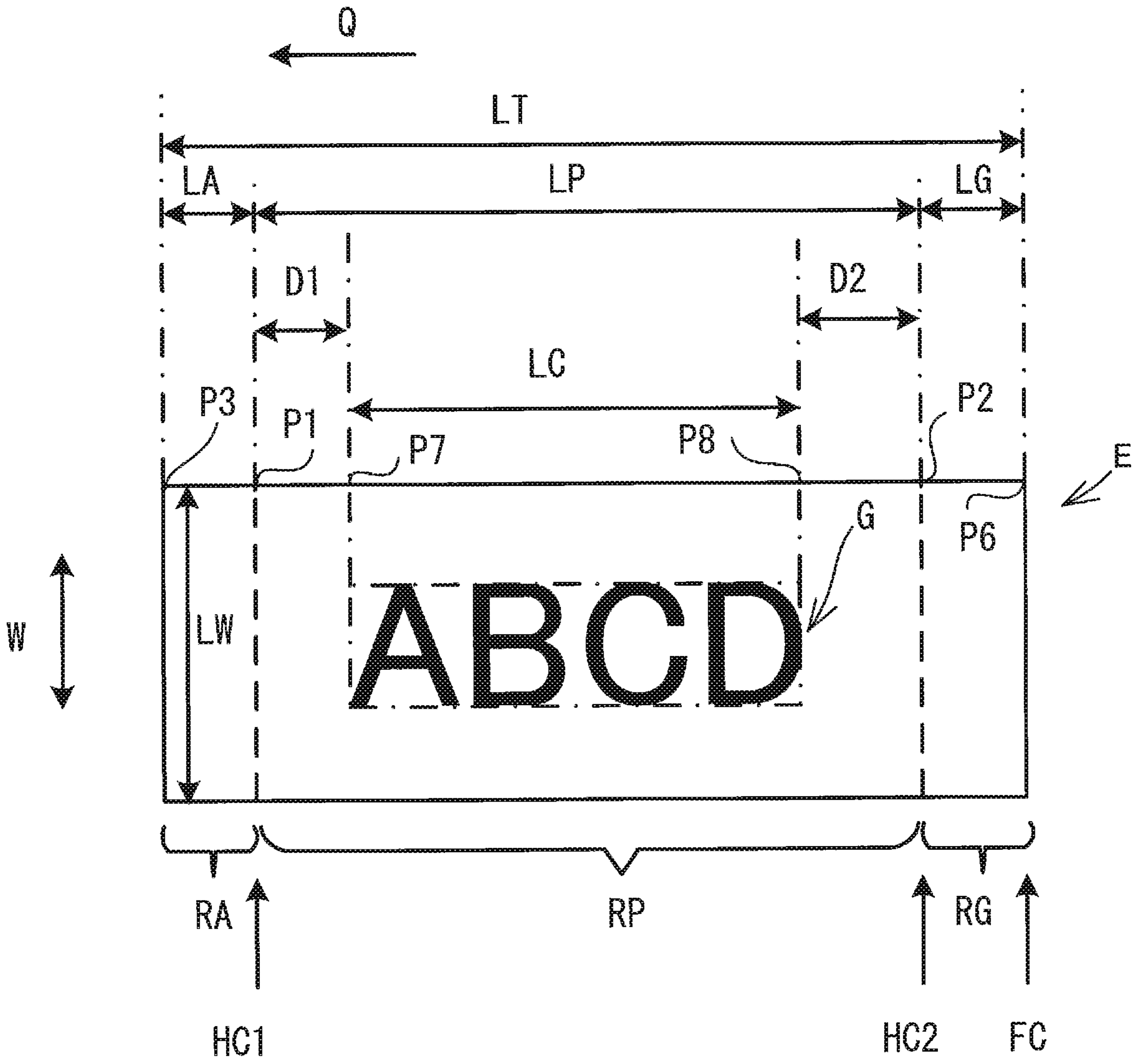
FIG. 5 is an explanatory diagram illustrating a process for setting an anchor area, a printing area, an adhesive area of a label created when the type of cassette is a third type.

In S3 the controller 2 acquires the image G to be printed in a printing area RP described later. As shown in FIGS. 3 through 5, the image G in Examples 1 through 3 has the alphabetic characters ABCD arranged at equal intervals in the printing area (printable area) RP from the downstream side to the upstream side in the conveying direction Q. The controller 2 also acquires a length LC of the image Gin the conveying direction Q.

In S4 the controller 2 determines whether the type of cassette acquired in S1 is the first type. In Example 1, the controller 2 determines that the type of cassette is the first type (S4: YES) and executes the main process for creating a label F to be wrapped around a cable C. Specifically, in S5 the controller 2 sets the printing area RP based on the type of cassette 80 acquired in S1 and the outer circumference M acquired in S2, as illustrated in FIG. 3.

A length LW of the printing area RP in the width direction W is defined by the type of cassette 80. The controller 2 sets a length LP of the printing area RP in the conveying direction Q to a value less than or equal to the outer circumference M acquired in S2. The length LP of the printing area RP in the conveying direction Q is greater than or equal to the length LC of the image G in the conveying direction Q. The controller 2 lays out the image G acquired in S3 at a prescribed position in the printing area RP.

In Example 1, the controller 2 arranges the image G so that: the distance from a downstream end P1 of the printing area RP in the conveying direction Q to a downstream end P7 of the image G in the conveying direction Q is a distance D1; and the distance from an upstream end P2 of the printing area RP in the conveying direction Q and an upstream end P8 of the image G in the conveying direction Q is a distance D2. The controller 2 may set the layout of the image G relative to the printing area RP as needed to a position where the image G is closer to one of the downstream end P1 or upstream end P2 of the printing area RP in the conveying direction Q.

In S6 the controller 2 sets an anchor area RA. The anchor area RA is the area adjacent to (next to) the printing area RP on one side of the printing area RP in the conveying direction Q. In the present embodiment, the downstream side in the conveying direction Q is defined as one side in the conveying direction Q and the upstream side is defined as the other side in the conveying direction Q. In the present embodiment, the controller 2 does not lay out or print an image in the anchor area RA. A length LW of the anchor area RA in the width direction W is defined by the type of cassette 80 and is equivalent to the length LW of the printing area RP in the width direction W. A length LA of the anchor area RA in the conveying direction Q is shorter than the length LP of the printing area RP. In the present embodiment, the length LA of the anchor area RA is shorter than half the outer circumference M acquired in S2.

In S7 the controller 2 sets a lamination area RL. The lamination area RL is adjacent to the printing area RP on the other side of the printing area RP in the conveying direction Q. In the present embodiment, the controller 2 does not lay out or print an image in the lamination area RL. The length LW of the lamination area RL in the width direction W is defined by the type of cassette 80 and is equivalent to the length LW of the printing area RP in the width direction W. The controller 2 sets a length LL of the lamination area RL in the conveying direction Q to be a value larger than or equal to the sum H of (1) the difference N between the outer circumference M of the cable C acquired in S2 and the length LP of the printing area RP in the conveying direction Q set in S5 (outer circumference M−length LP) and (2) the length from the downstream end P1 of the printing area RP in the conveying direction Q to the upstream end P8 of the image G in the conveying direction Q (distance D1+length LC).

Figure 6:
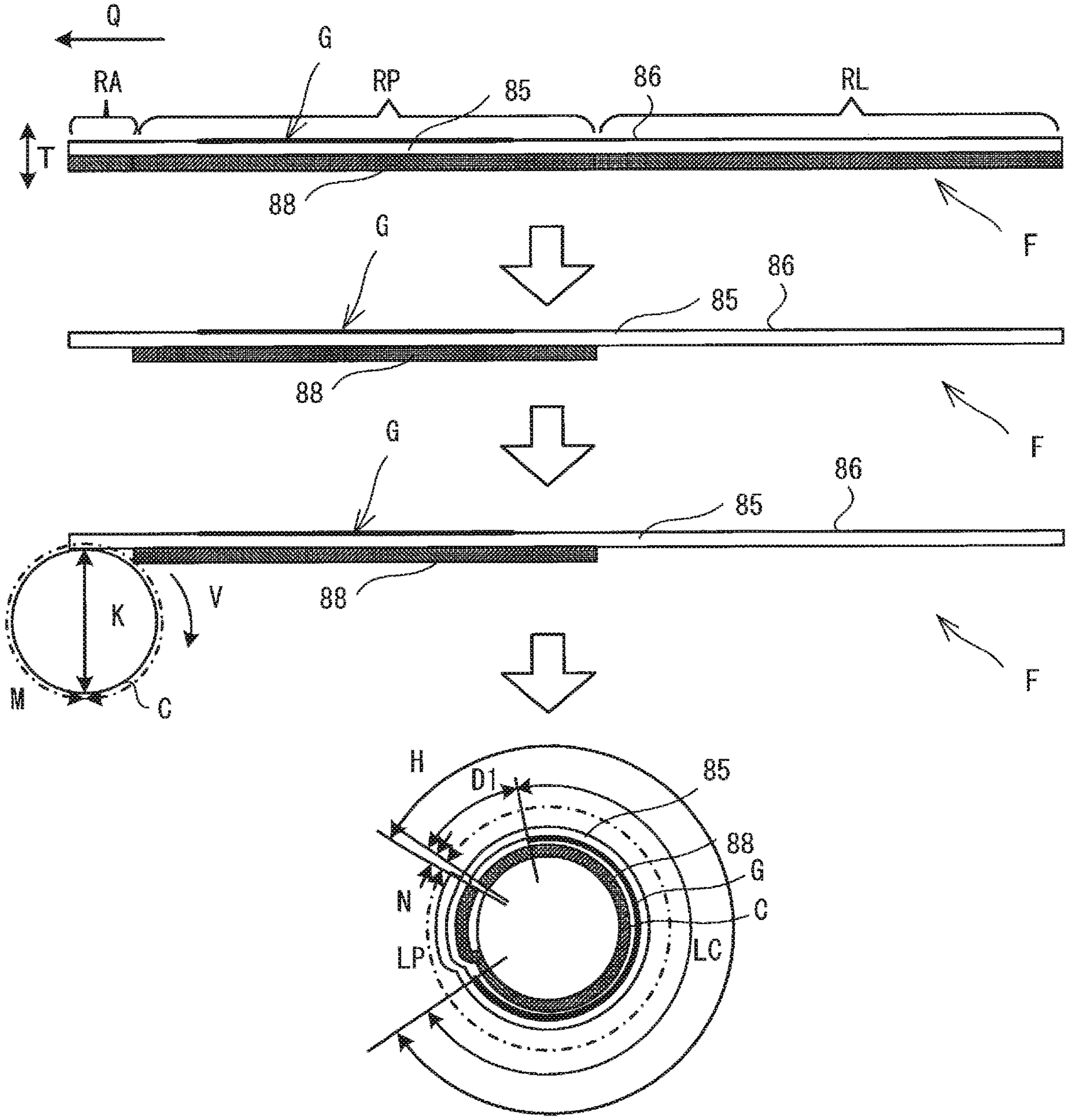
FIG. 6 is an explanatory diagram illustrating an operation wrapping, around a cable, the label shown in FIG. 3 created according to print data.

When a label F having a printing area RP with a length LP equivalent to the outer circumference M is wrapped around the cable C, the printing area RP is wrapped once around the entire circumference of the cable C so that the upstream end P2 of the printing area RP in the conveying direction Q meets the downstream end P1 of the printing area RP in the conveying direction Q. When a label F having a printing area RP with a length LP shorter than the outer circumference M is wrapped around the cable C, the printing area RP does not wrap all the way around the circumference of the cable C, as illustrated in FIG. 6, and the upstream end P2 of the printing area RP in the conveying direction Q is separated in the circumferential direction of the cable C from the downstream end P1 of the printing area RP in the conveying direction Q by the difference N between the length LP and the outer circumference M.

When the label F is wrapped around the cable C, an upstream end P6 of the lamination area RL in the conveying direction Q overlaps the upstream end P8 of the image Gin the conveying direction Q, provided that the length LL of the lamination area RL is equivalent to the sum H described above. In other words, the image G printed in the printing area RP is entirely covered by the lamination area RL. The area between the upstream end P2 of the printing area RP in the conveying direction Q and the upstream end P8 of the image Gin the conveying direction Q is not covered by the lamination area RL.

Alternatively, the length LL of the lamination area RL in the conveying direction Q may be set greater than or equal to the outer circumference M, i.e., the sum of (1) the difference N between the outer circumference M and the length LP of the printing area RP in the conveying direction Q and (2) the length LP from the downstream end P1 to the upstream end P2 of the printing area RP in the conveying direction Q. When a label F having a lamination area RL with a length LL equivalent to the outer circumference M of a cable C is wrapped around the cable C, the upstream end P6 of the lamination area RL in the conveying direction Q overlaps the upstream end P2 of the printing area RP in the conveying direction Q. That is, the entire printing area RP is covered by the lamination area RL.

The controller 2 in the present embodiment executes the process from S5 to S7 by reading a template from the table 17 stored in the storage 3. Each template includes information specifying the length LW of the label in the width direction W, the length LA of the anchor area RA in the conveying direction Q, the length LP of the printing area RP in the conveying direction Q, and the length LL of the lamination area RL in the conveying direction Q.

In S8 the controller 2 sets a first half cut position HC1, as shown in FIG. 3. The first half cut position HC1 is a position at the boundary between the printing area RP and the anchor area RA at which the cutting member 16 is controlled to perform a half cut across the tape 81 in the width direction W. In S9 the controller 2 sets a second half cut position HC2. The second half cut position HC2 is a position at the boundary between the printing area RP and the lamination area RL at which the cutting member 16 is controlled to perform a half cut across the tape 81 in the width direction W. The controller 2 may also set a cutting depth and cutting direction in S8 and S9. In Example 1, the controller 2 sets the cutting depth to the thickness of the release material 88 and sets the cutting direction to the direction from the roller 10 toward the printing member 8.

In S10 the controller 2 sets a full cut position FC. The full cut position FC is a position at a downstream end P3 of the anchor area RA in the conveying direction Q or the upstream end P6 of the lamination area RL in the conveying direction at which the cutting member 16 is controlled to perform a full cut across the tape 81 in the width direction W. In the present embodiment, the controller 2 sets the full cut position FC at the upstream end P6 of the lamination area RL in the conveying direction Q.

The first half cut position HC1, the second half cut position HC2, and the full cut position FC in the present embodiment are each expressed by a distance from the downstream end P3 of the anchor area RA in the conveying direction Q. Thus, the first half cut position HC1 is expressed as the length LA, the second half cut position HC2 is expressed as the sum of the length LA and the length LP, and the full cut position FC is expressed by a length LT, which is the sum of the lengths LA, LP, and LL. At least one of the first half cut position HC1, the second half cut position HC2, and the full cut position FC may be set according to the template stored in the table 17.

In S11 the controller 2 generates print data that includes data for printing the image G acquired in S3 in the printing area RP set in S5, the first half cut position HC1 set in S8, the second half cut position HC2 set in S9, and the full cut position FC set in S10.

In Examples 2 and 3, on the other hand, the controller 2 determines in S4 that the type of the cassette 90 acquired in S1 is not the first type (S4: NO) and in S12 determines whether an execution instruction was detected for executing the main process including S5 through S11. To have the main process executed, the user inputs an execution instruction via the input interface 6. When an execution instruction was detected (S12: YES), the controller 2 executes the main process including S5 through S11 described above.

However, when an execution instruction was not detected (S12: NO), in S13 the controller 2 sets the printing area RP for cases in which the type of the cassette 90 is the second type or the third type, as illustrated in FIGS. 4 and 5, respectively. The length LW of the printing area RP in the width direction W is defined by the type of cassette 90. In the present embodiment, the controller 2 sets the length LP of the printing area RP in the conveying direction Q to the outer circumference M acquired in S2. As in S5, the controller 2 arranges the image G acquired in S3 at a prescribed position in the printing area RP.

In S14 the controller 2 sets the anchor area RA. The length LW of the anchor area RA in the width direction W is defined by the type of cassette 90 and is equivalent to the length LW of the printing area RP in the width direction W. The controller 2 sets the length LA of the anchor area RA in the conveying direction Q shorter than the outer circumference M. The length LT is greater than the outer circumference M acquired in S2. In Example 2, the length LT is the sum of the length LP of the printing area RP in the conveying direction Q and the length LA of the anchor area RA in the conveying direction Q. In Example 3, the length LT is the sum of the length LP of the printing area RP in the conveying direction Q, the length LA of the anchor area RA in the conveying direction Q, and a length LG in the conveying direction Q of an adhesive area RG described later. The controller 2 executes S13 and S14 in the present embodiment by reading a template from the table 17 stored in the storage 3.

In S15 the controller 2 determines whether the type of the cassette 90 acquired in S1 is the second type. In Example 2, the controller 2 determines that the cassette 90 is the second type (S15: YES) and in S16 sets the full cut position FC. The full cut position FC is expressed as the distance from the downstream end P3 of the anchor area RA in the conveying direction Q. In S17 the controller 2 generates print data that includes data for printing the image G acquired in S3 in the printing area RP set in S13, and the full cut position FC set in S16.

In Example 3, the controller 2 determines in S15 that the cassette 90 is not the second type (S15: NO), and in S18 sets an adhesive area RG, as illustrated in FIG. 5. The adhesive area RG is adjacent to the printing area RP on the other side of the printing area RP in the conveying direction Q. The length LW of the adhesive area RG in the width direction W is defined by the type of cassette 90 and is identical to the length LW of the printing area RP in the width direction W.

In S19 the controller 2 sets the first half cut position HC1 and the second half cut position HC2. The first half cut position HC1 is a position at the boundary between the printing area RP and the anchor area RA at which the cutting member 16 is controlled to perform a half cut across the tape 81 in the width direction W. The second half cut position HC2 is a position at the boundary between the printing area RP and the adhesive area RG at which the cutting member 16 is controlled to perform a half cut across the tape 81 in the width direction W. In S19 the controller 2 may also set a cutting depth and cutting direction. In Example 3, the controller 2 sets the cutting depth to the thickness of the release material 99 and sets the cutting direction to the direction from the printing member 8 toward the roller 10.

In S20 the controller 2 sets a full cut position FC. The controller 2 sets the full cut position FC to the upstream end P6 of the adhesive area RG in the conveying direction Q. In S21 the controller 2 generates print data that includes data for printing the image G acquired in S3 in the printing area RP set in S13, the half cut positions HC1 and HC2 set in S19, and the full cut position FC set in S20.

Following S11, S17, or S21, in S22 the controller 2 determines whether a print instruction was detected. The user inputs a print instruction via the input interface 6 to begin a print based on the print data generated in S11, S17, or S21. When a print instruction was not detected (S22: NO), the controller 2 waits until a print instruction is detected. Once a print instruction is detected (S22: YES), in S23 the controller 2 begins driving the conveying member 9 to convey the tape.

In S24 the controller 2 determines whether the tape has arrived at a printing position based on the drive amount of the conveying member 9. When the tape is at the printing position (S24: YES), in S25 the controller 2 drives the printing member 8 according to the print data to print the base material of the tape. However, when the tape is not at the printing position (S24: NO), in S26 the controller 2 determines whether the tape is in the first half cut position HC1 or the second half cut position HC2 based on the drive amount of the conveying member 9.

When the tape 81 is in the first half cut position HC1 or the second half cut position HC2 in Example 1 (S26: YES), in S27 the controller 2 drives the half cutter 14 of the cutting member 16 an amount corresponding to the cutting depth based on the cutting depth and cutting direction included in the print data to perform a half cut in the tape 81 from the release material 88 side. When the tape 100 is at the first half cut position HC1 or the second half cut position HC2 in Example 3 (S26: YES), in S27 the controller 2 drives the half cutter 15 of the cutting member 16 an amount corresponding to the cutting depth based on the cutting depth and cutting direction included in the print data to perform a half cut in the tape 100 from the release material 99 side.

When the tape is not in the first half cut position HC1 or the second half cut position HC2 (S26: NO), in S28 the controller 2 determines whether the tape is in the full cut position FC based on the drive amount of the conveying member 9. When the tape is at the full cut position FC (S28: YES), in S29 the controller 2 drives the full cutter 13 of the cutting member 16 to perform a full cut through the tape. Following S25, S27, or S29 or when the tape is not in the full cut position FC (S28: NO), the controller 2 performs the process in S30.

In S30 the controller 2 determines whether printing was completed. The controller 2 determines that printing was completed when the tape has been conveyed a prescribed amount after the full cut process was performed in S29 based on the drive amount of the conveying member 9. When printing was not completed (S30: NO), the controller 2 returns to S24. Once printing was completed (S30: YES), in S31 the controller 2 halts the drive of the conveying member 9 and ends the printing process described above. Through this printing process, the controller 2 creates the label F shown in FIG. 3 in Example 1, the label J shown in FIG. 4 in Example 2, or the label E shown in FIG. 5 in Example 3.

Next, operations for wrapping the label F created in the printing process of Example 1 around a cable C will be described with reference to FIG. 6. Using the cuts formed at the half cut positions HC1 and HC2, the user peels off the release material 88 of the label F at the anchor area RA and the lamination area RL. The user then wraps the label F around the cable C in a wrapping direction V in the order of the anchor area RA, printing area RP, and lamination area RL, with the width direction W of the label F aligned in the extended direction of the cable C and with the exposed adhesive layer of the label F facing the cable C. The anchor area RA is affixed to the cable C. The printing area RP contacts the cable C and a portion of the anchor area RA. The lamination area RL is affixed to a portion of the anchor area RA and the printing area RP. The base material 85 in the printing area RP is covered and protected by the base material 85 in the lamination area RL. Since the base material 85 is transparent, the user can see the image G printed in the printing area RP. The position of the label F is fixed relative to the cable C since the anchor area RA is affixed to the cable C.

Figure 7:
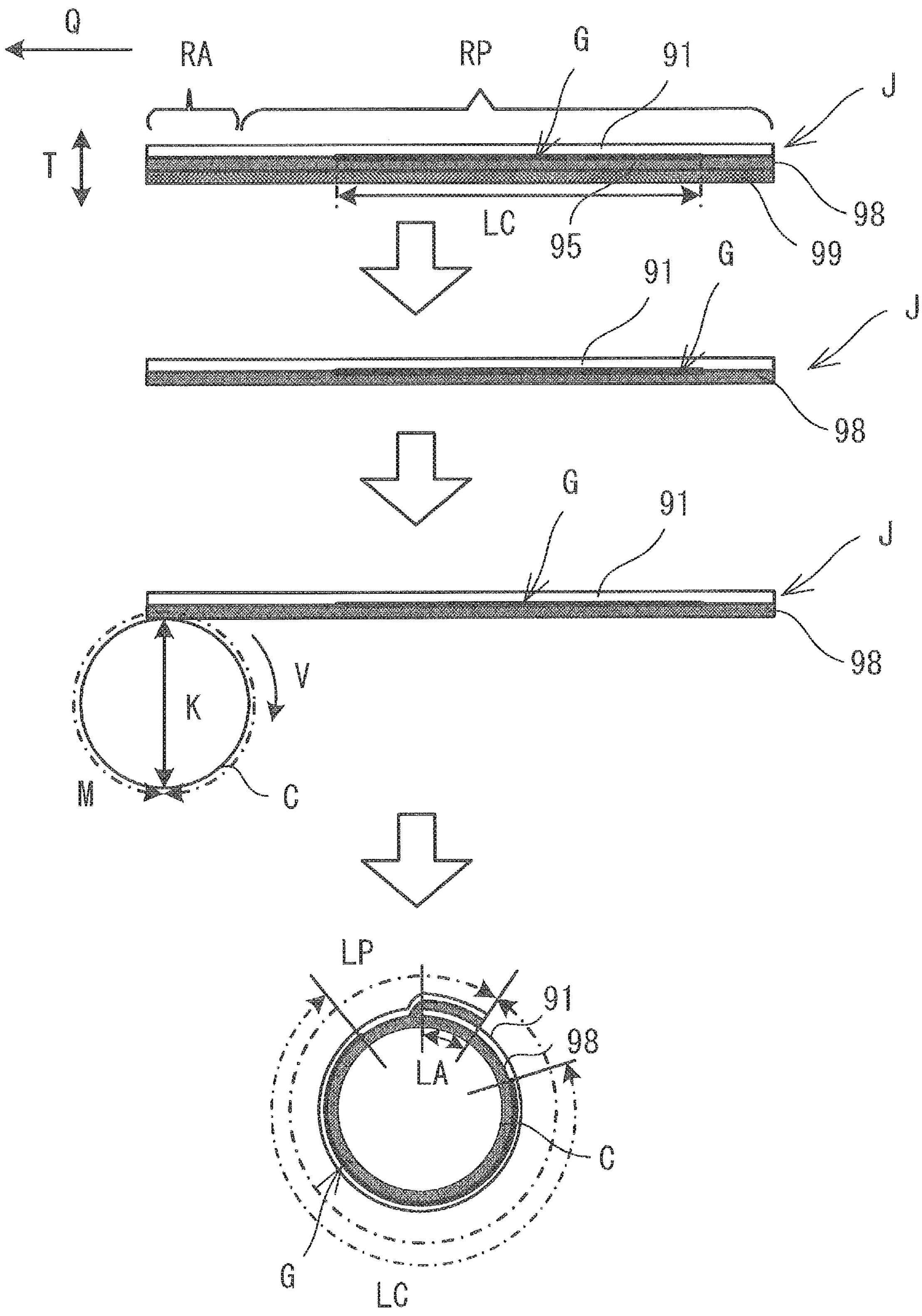
FIG. 7 is an explanatory diagram illustrating an operation wrapping, around a cable, the label shown in FIG. 4 created according to print data.

Next, operations for wrapping the laminated label J created in the printing process of Example 2 around the cable C will be described with reference to FIG. 7. First, the user peels off the entire release material 99 of the label J. Next, the user wraps the label J around the cable C in the wrapping direction V in the order of the anchor area RA and the printing area RP, with the width direction W of the label J aligned in the extended direction of the cable C and with the exposed adhesive layer of the label J opposing the cable C. The anchor area RA is first affixed to the cable C. The printing area RP is affixed to the cable C and a portion of the anchor area RA. Since the printing surface 95 on the base material 91 in the printing area RP is affixed to the base material 98, the printing surface 95 is protected by the base material 91. Since the base material 91 is transparent, the user can see the image G printed in the printing area RP. Since the base material 98 is non-transparent, the base material 98 of the printing area RP serves as the background for the printing area RP.

Figure 8:
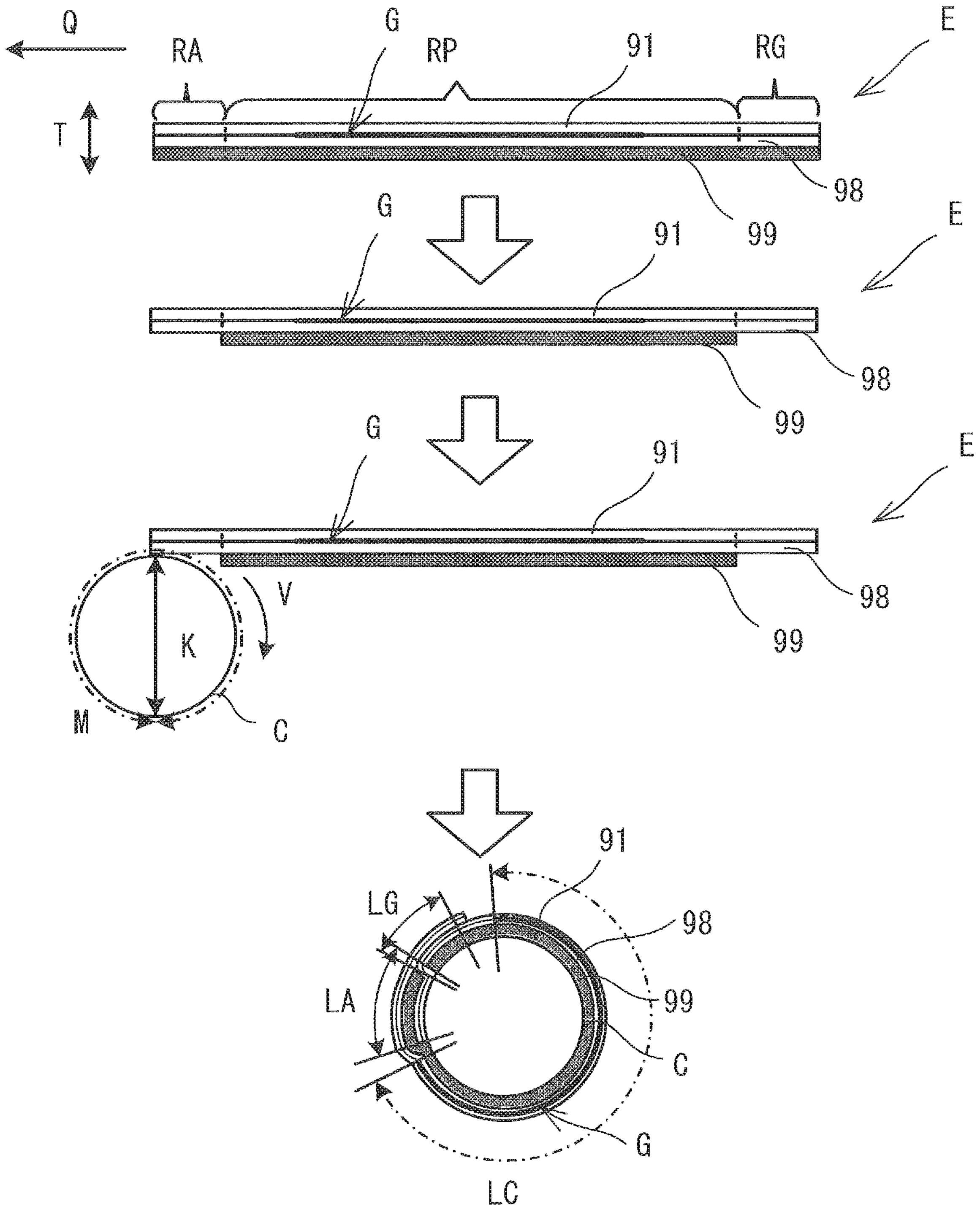
FIG. 8 is an explanatory diagram illustrating an operation wrapping, around a cable, the label shown in FIG. 5 created according to print data.

Next, operations for wrapping the laminated label E created in the printing process of Example 3 around the cable C will be described with reference to FIG. 8. Using the cuts formed at the half cut positions HC1 and HC2, the user peels off the release material 99 of the label E at the anchor area RA and the adhesive area RG. Next, the user wraps the label E around the cable C in the wrapping direction V in the order of the anchor area RA, printing area RP, and adhesive area RG, with the width direction W of the label E aligned in the extended direction of the cable C and with the exposed adhesive layer of the label E facing the cable C. Here, the anchor area RA is first affixed to the cable C. The printing area RP then contacts the cable C and a portion of the anchor area RA. Lastly, the adhesive area RG is affixed to a portion of the anchor area RA and the printing area RP. Since the printing surface 95 on the base material 91 of the printing area RP is affixed to the base material 98, the printing surface 95 is protected by the base material 91. Since the base material 91 is transparent, the user can see the image G printed in the printing area RP. Since the base material 98 is also transparent, the release material 99 of the printing area RP serves as the background for the printing area RP.

In the present embodiment, the printing device 1, the controller 2, the sensor 4, the input interface 6, the printing member 8, the conveying member 9, the cutting member 16, the storage 3, and the cassette mount part 21 are respectively examples of the printing device, the controller, the detector, the input interface, the print head, the conveyer, the cutter, the storage, and the mount part. The half cutters 14 and 15 are examples of the half cutter. The full cutter 13 is an example of the full cutter. The process of S2 is an example of the acquisition process. The process of S3 is an example of the image acquisition process. The processes of S5-S7 are an example of the area setting process. The process of S25 is an example of the printing process. The process of S27 is an example of the first half cut process and an example of the second half cut process. The process of S29 is an example of the full cut process. The process of S8 is an example of the first half cut setting process. The process of S9 is an example of the second half cut setting process. The process of S10 is an example of the full cut setting process. The process of S11 is an example of the generation process. The process of S13 is an example of the printing area setting process. The process of S29 is an example of the cutting process.

In the first embodiment described above, the printing device 1 is provided with the printing member 8, the conveying member 9, the cutting member 16, and the controller 2. The printing member 8 prints an image G on the base material 85. The conveying member 9 conveys, in the conveying direction Q, the tape 81, which includes: the base material 85 on which the printing member 8 has printed the image G; and the release material 88 that is bonded to the base material 85. The cutting member 16 performs half cuts for cutting through the release material 88 while not cutting the base material 85, and full cuts for cutting through both the base material 85 and the release material 88.

The controller 2 controls the conveying member 9, the printing member 8, and the cutting member 16. The controller 2 performs the following processes. That is, the controller 2 acquires the outer circumference M of the cable C around which the label formed by cutting the tape 81 is to be wrapped (S2); acquires the image G to be printed in the printing area RP (S3). Based on the acquired outer circumference M, the controller 2 sets the printing area RP; the anchor area RA adjacent to the printing area RP on one side of the printing area RP in the conveying direction Q; and the lamination area RL adjacent to the printing area RP on the other side of the printing area RP in the conveying direction Q so that the length LL of the lamination area RL in the conveying direction Q is greater than or equal to the sum H of: the difference N between the outer circumference M and the length LP of the printing area RP in the conveying direction Q; and the length from the downstream end P1 of the printing area RP in the conveying direction Q to the upstream end P8 of the image Gin the conveying direction Q (S5-S7).

Next, the controller 2 sets the first half cut position HC1 at the boundary between the printing area RP and the anchor area RA to instruct a half cut be performed across the tape 81 in the width direction W (S8). The controller 2 sets the second half cut position HC2 at the boundary between the printing area RP and the lamination area RL to instruct a half cut be performed across the tape 81 in the width direction W (S9). The controller 2 sets the full cut position FC at either the one end P3 of the anchor area RA in the conveying direction Q or the other end P6 of the lamination area RL in the conveying direction Q for performing a full cut through the tape 81 across the tape 81 in the width direction W (S10). The controller 2 generates print data that includes data for printing the image G in the printing area RP, the first half cut position HC1, the second half cut position HC2, and the full cut position FC (S11).

Next, the controller 2 controls the printing member 8 to print the image G in the printing area RP (S25). The controller 2 controls the cutting member 16 to perform a half cut through the tape 81 in the width direction W at the boundary between the printing area RP and the anchor area RA (S27). The controller 2 controls the cutting member 16 to perform a half cut through the tape 81 in the width direction W at the boundary between the printing area RP and the lamination area RL (S27). The controller 2 controls the cutting member 16 to perform a full cut through the tape 81 in the width direction W at either the one end P3 of the anchor area RA in the conveying direction Q or the other end P6 of the lamination area RL in the conveying direction Q to cut off the label F (S29).

Through this process, the printing device 1 can create a label F in which the release material 88 is cut at the boundary between the printing area RP and the anchor area RA and the boundary between the printing area RP and the lamination area RL. When a tape 81 having transparent film as the base material 85 is used to create the label F, for example, the user peels off the release material 88 in the anchor area RA and the release material 88 in the lamination area RL from the base material 85, and wraps the label F around the cable C in the order of the anchor area RA, printing area RP, and lamination area RL while the release material 88 in the printing area RP remains affixed to the base material 85. At this time, the anchor area RA is affixed to the outer circumference of the cable C. Further, since the release material 88 remains affixed to the base material 85 in the printing area RP, the user can easily recognize the image G printed on a transparent base material 85 when the release material 88 is colored regardless of the transparent base material 85.

The lamination area RL is bonded to at least a portion of the anchor area RA and the printing area RP and covers the image G printed in the printing area RP. Therefore, the printing device 1 can create a self-laminating label F to be wrapped around a cable C using the same tape 81 for all outer circumferences M of cables C. By changing the surface color on the base material 85 side of the release material 88, the background color of labels F produced from the tape 81 can be changed. Since the tape 81 is continuous with no fixed length, the printing device 1 can create labels F with less waste than that produced by conventional devices simply by acquiring the outer circumference M of the cable C in S2 and setting the lengths LP and LL based on this outer circumference M.

The cutting member 16 of the printing device 1 is provided with the half cutters 14 and 15 that perform half cuts, and the full cutter 13 that performs full cuts. When creating a label F using the first type of cassette 80, the controller 2 controls the conveying member 9 and the half cutter 14 to execute both a first half cut process and a second half cut process (S27). When creating a label E using the third type of cassette 90, the controller 2 controls the conveying member 9 and the half cutter 15 to execute both a first half cut process and a second half cut process (S27). The controller 2 controls the conveying member 9 and the full cutter 13 to execute a full cut process. Thus, the printing device 1 uses the appropriate half cutters 14 and 15 and the full cutter 13 to execute the printing process.

The printing device 1 is provided with the cassette mount part 21 in which a cassette accommodating at least a base material is detachably mounted, and the sensor 4 that detects the type of cassette mounted in the cassette mount part 21. The controller 2 can execute the main process when the type of cassette detected by the sensor 4 is the first type, which accommodates a tape 81 with a release material 88 affixed to the back surface 87 of a transparent base material 85 (i.e., the opposite side of the printing surface 86) via an adhesive layer. Thus, the printing device 1 can avoid problems that may occur if the main process were executed when using the tape 93, whose base material 98 is not transparent film. Further, by executing the main process, the printing device 1 can create a self-laminating label F in which the printing surface 86 of the base material 85 is covered by the lamination area RL of the base material 85 to protect the image G.

The controller 2 of the printing device 1 performs the following process when the detected type of cassette is the second type, which accommodates a tape 93 having a release material 99 affixed to a non-transparent base material 98 via an adhesive layer (S4: NO). The controller 2 sets the printing area RP based on the outer circumference M acquired in S2 (S13). The controller 2 acquires the image G to be printed in the printing area RP (S3). The controller 2 controls the printing member 8 to print the image G in the printing area RP (S25). The controller 2 controls the cutting member 16 to perform a full cut across the tape 100 in the width direction W at either the upstream end P2 of the printing area RP in the conveying direction Q or a position upstream of the upstream end P2 (S29). Thus, when the cassette type detected by the sensor 4 is the second type, the printing device 1 can create a label J by setting the printing area RP according to the acquired outer circumference M.

The printing device 1 is provided with the storage 3 that stores templates corresponding to the types of cassettes detected by the sensor 4 and outer circumferences M. The controller 2 executes the process from S5 to S7 by reading the template corresponding to the detected cassette type and the outer circumference M from the storage 3. By reading a template in this way, the printing device 1 can execute the processes in S5 through S7 and S13 relatively easily.

The printing device 1 is provided with the input interface 6. When an instruction is detected through the input interface 6 (S12: YES), the controller 2 executes the main process. Thus, the printing device 1 can execute the main process when an instruction is detected. This method can enhance user convenience compared to cases in which the printing device 1 does not execute the main process in response to a user instruction.

The length LP of the printing area RP in the conveying direction Q is set less than or equal to the outer circumference M. Thus, the printing device 1 can use less tape 81 than when the length LP of the printing area RP in the conveying direction Q is set longer than the outer circumference M of the cable C.

The length LL of the lamination area RL in the conveying direction Q is set greater than or equal to the outer circumference M. When a label F having transparent film as the base material 85 is wrapped around the outer circumference of a cable C, the lamination area RL covers the entire printing area RP. Accordingly, the printing device 1 can ensure that the image G is covered by the lamination area RL, regardless of where the image G is arranged in relation to the printing area RP.

Next, the printing device 1 according to a second embodiment will be described. In the second embodiment, the same reference numbers are used for structures and steps identical to those in the first embodiment, and descriptions of these identical structures and steps will be omitted. The configuration of the printing device 1 according to the second embodiment is identical to that described in FIG. 1, except that the storage 3 does not store the table 17. Further, the cassette 90 in the second embodiment is assumed to be only a cassette of the third type. However, the base material 98 in the third type of cassette may be transparent or non-transparent.

The thicknesses of the base materials 85, 91, and 98 are in the range from 50 to 100 μm, such as 80 μm. The thicknesses of the release materials 88 and 99 are in the range from 10 to 50 μm, such as 20 μm. Hence, the thicknesses of the base materials 85, 91, and 98 are greater than the thicknesses of the release materials 88 and 99. In half cuts performed in the second embodiment, the cutting member 16 cuts through a portion of the tape in the thickness direction T from the release material side.

The printing process performed by the printing device 1 of the second embodiment will be described for Examples 4 and 5 with reference to FIGS. 9 through 13. Example 4 (FIGS. 10 and 12) provides a case in which the printing device 1 uses the first type of cassette 80 to create a self-laminating rotating label F to be wrapped around a cable C having a circular outer circumference with a diameter of K mm. Example 5 (FIGS. 11 and 13) provides a case in which the printing device 1 uses the third type of cassette 90 to create a laminated rotating label E to be wrapped around a cable C. The printing device 1 executes printing processes while either the cassette 80 or cassette 90 is mounted in the printing device 1. Although printing processes for Examples 4 and 5 are executed at different timings, the processes will be described below in parallel in order to simplify the description.

When the controller 2 detects an instruction to begin a printing process via the input interface 6, the controller 2 reads from the storage 3 the print data generation program for executing printing processes. The controller 2 executes a printing process having the following steps according to instructions in the print data generation program. Various data acquired during the printing process is stored in the storage 3 where appropriate. In the following process, "step" is abbreviated as "S" in the step numbers. Since the diameter K mm of the cable C is sufficiently larger than the thickness of labels created during the printing process, the printing process is performed without regard for the effects of label thickness when the label is wrapped around a cable C.

Figure 9:
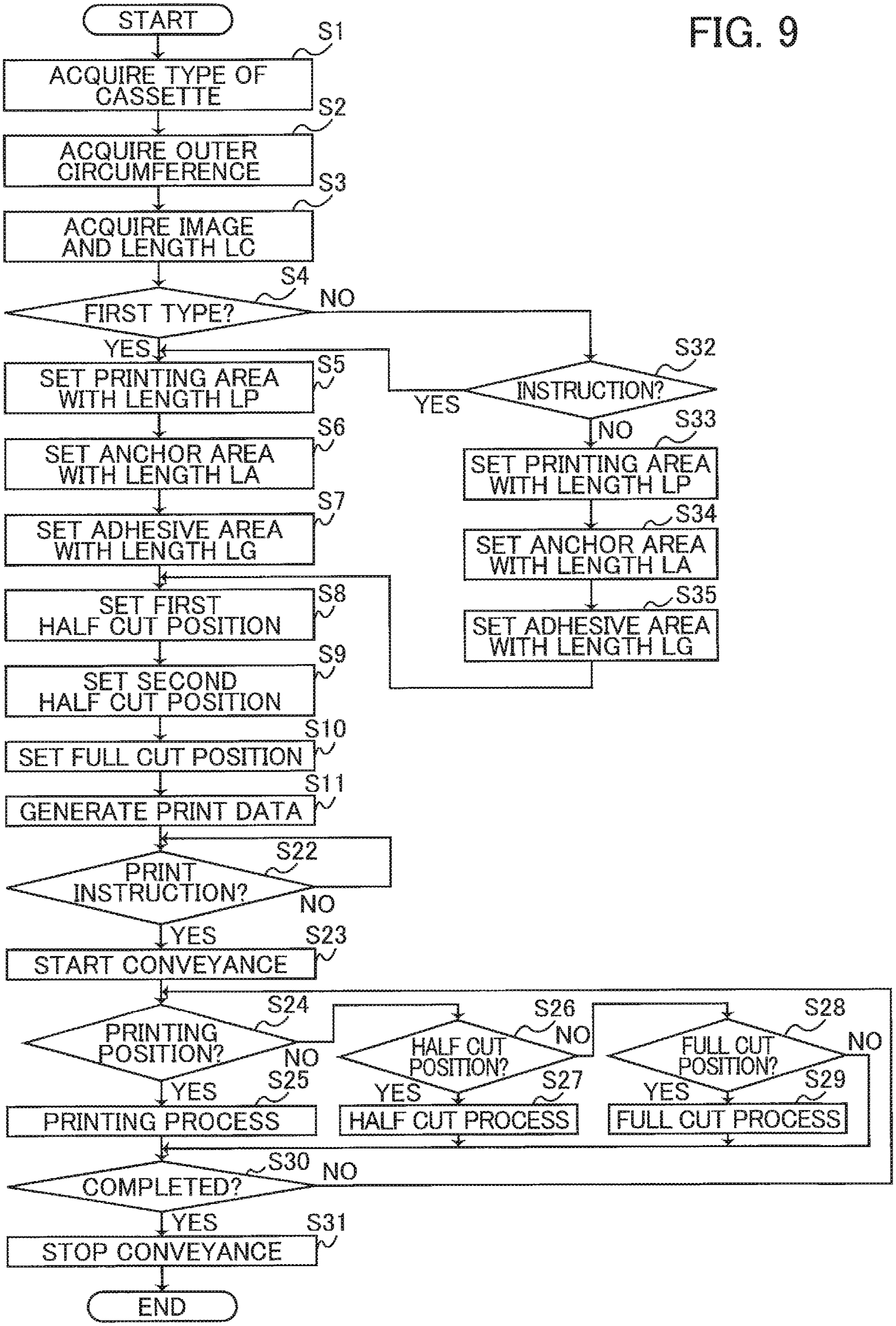
FIG. 9 is a flowchart illustrating a printing process.

In S1 of FIG. 9, the controller 2 acquires the type of cassette mounted in the cassette mount part 21 based on detection results from the sensor 4. The controller 2 acquires the first cassette type in Example 4 and the third cassette type in Example 5.

In S2 the controller 2 acquires the outer circumference M of the cable C, which is the object around which the label cut from the tape will be wrapped. Any suitable method may be used for acquiring the outer circumference M of the cable C. For example, the controller 2 may acquire a value inputted by the user through the input interface 6 as the outer circumference M or may calculate the outer circumference M using the diameter K inputted by the user via the input interface 6. When the storage 3 stores correlations between types of cables C, such as the product names and model numbers of cables C and the outer circumferences M of cables C, the controller 2 may acquire the outer circumference M from the storage 3 that corresponds to the type of cable C inputted by the user through the input interface 6.

Figure 10:
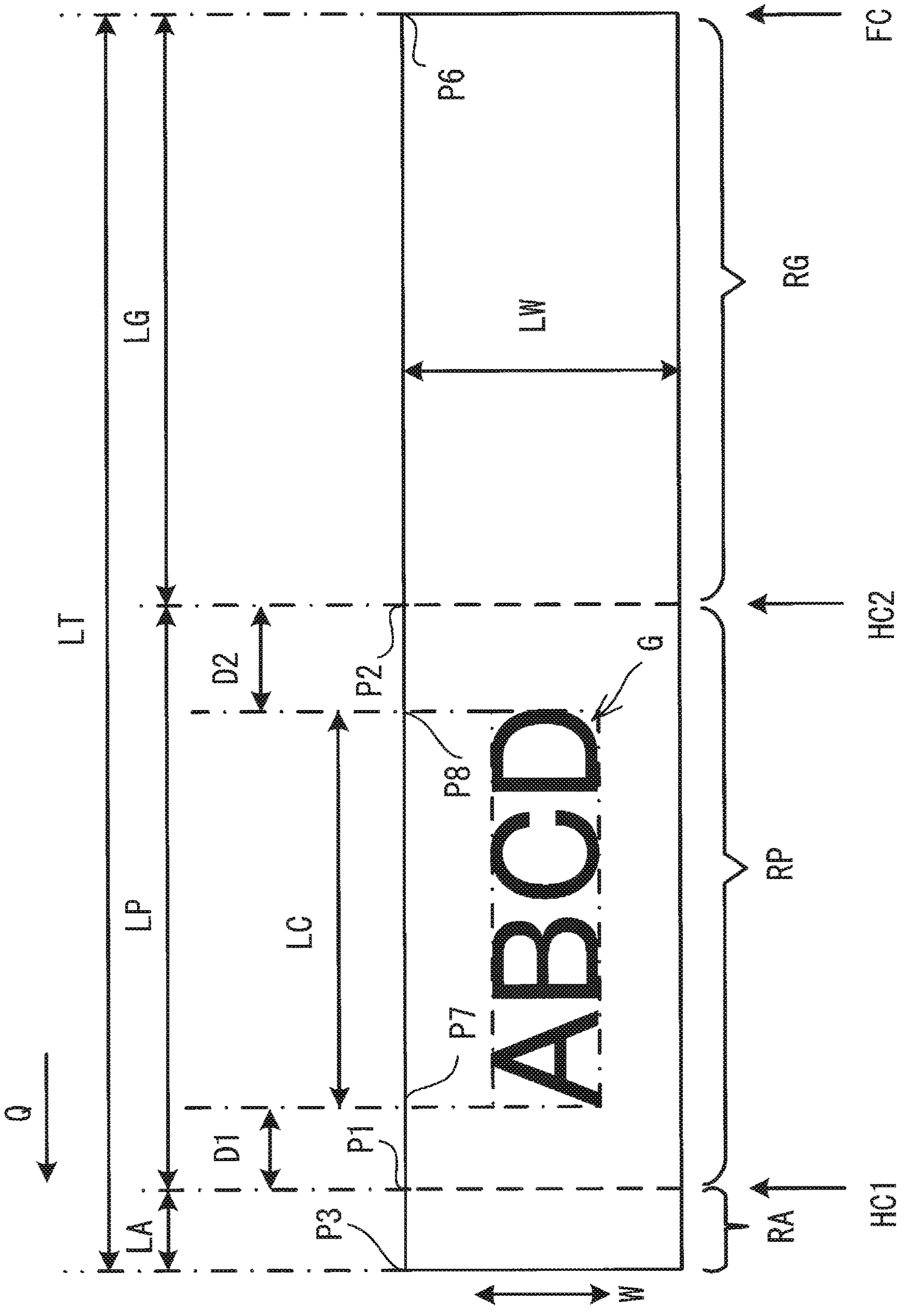
FIG. 10 is an explanatory diagram illustrating a process for setting an anchor area, a printing area, and an adhesive area of a label created when the type of cassette is the first type.
Figure 11:
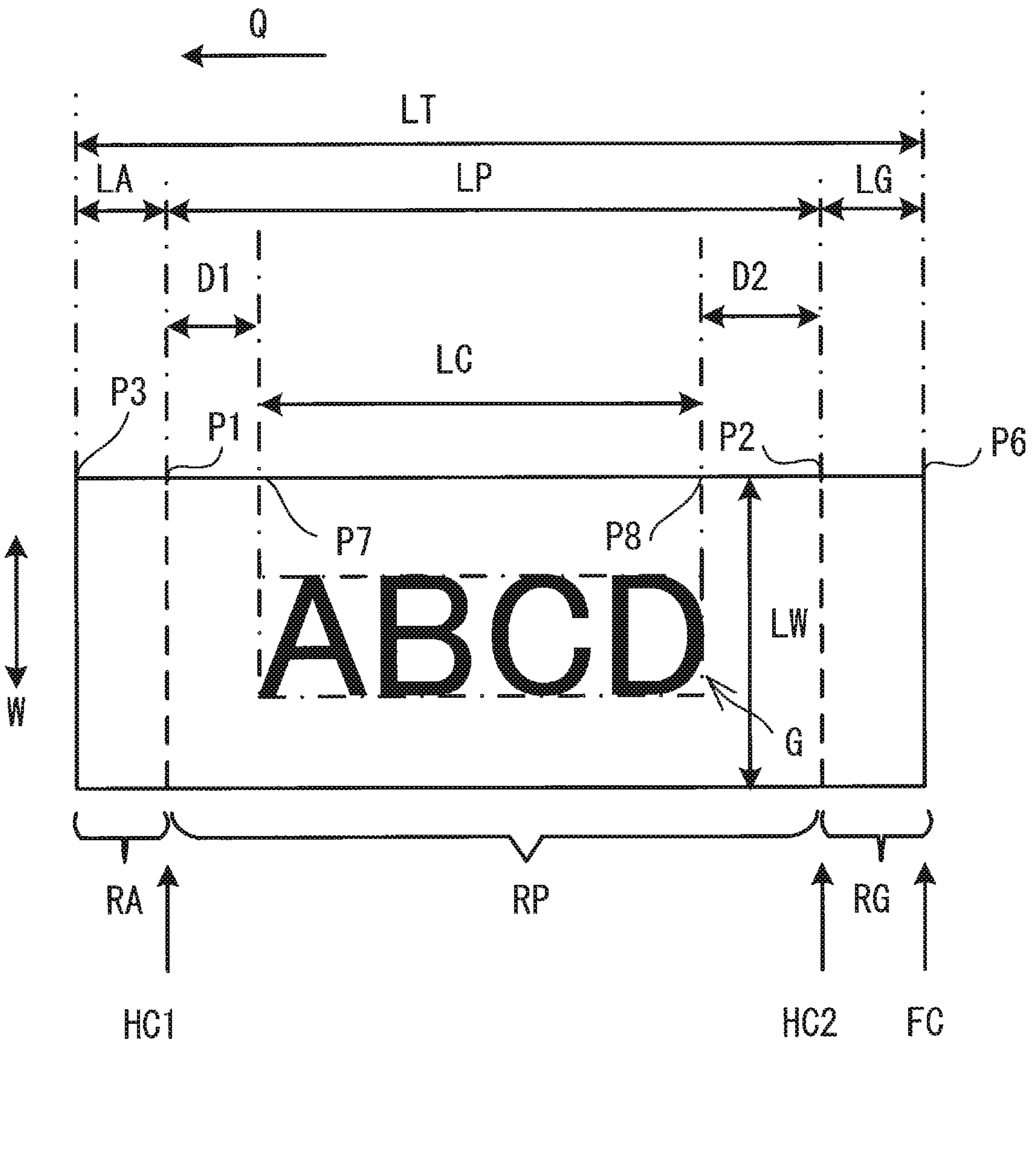
FIG. 11 is an explanatory diagram illustrating a process for setting an anchor area, and a printing area, and an adhesive area of a label created when the type of cassette is the third type.

In S3 the controller 2 acquires the image G to be printed in the printing area RP. As shown in FIGS. 10 and 11, the image G in Examples 4 and 5 has the alphabetic characters ABCD arranged at equal intervals in the printing area RP from the downstream side toward the upstream side in the conveying direction Q. The controller 2 also acquires the length LC of the image G in the conveying direction Q.

In S4 the controller 2 determines whether the type of cassette acquired in S1 is the first type. In Example 4, the controller 2 determines that the type of cassette 80 is the first type (S4: YES) and executes a process to create a self-laminating rotating label F shown in FIG. 10 to be wrapped around a cable C. Specifically, in S5 the controller 2 sets the printing area RP based on the type of cassette 80 acquired in S1 and the outer circumference M acquired in S2, as illustrated in FIG. 10.

The length LW of the printing area RP in the width direction W is defined by the type of cassette 80. The controller 2 sets the length LP of the printing area RP in the conveying direction Q to a value greater than or equal to the outer circumference M acquired in S2. The length LP of the printing area RP in the conveying direction Q is greater than or equal to the length LC of the image G in the conveying direction Q. The controller 2 lays out the image G acquired in S3 at a prescribed position in the printing area RP.

In Example 4, the controller 2 arranges the image G so that the distance from the downstream end P1 of the printing area RP in the conveying direction Q to the downstream end P7 of the image Gin the conveying direction Q is a distance D1, and the distance from the upstream end P2 of the printing area RP in the conveying direction Q and the upstream end P8 of the image G in the conveying direction Q is a distance D2. The controller 2 may set the layout of the image G relative to the printing area RP as needed to a position where the image G is closer to either the downstream end P1 or upstream end p2 of the printing area RP in the conveying direction Q.

In S6 the controller 2 sets the anchor area RA. The anchor area RA is the area adjacent to the printing area RP on one side of the printing area RP in the conveying direction Q. In the present embodiment, the downstream side in the conveying direction Q is defined as one side in the conveying direction Q while the upstream side is defined as the other side in the conveying direction Q. In the present embodiment, the controller 2 does not lay out or print an image in the anchor area RA. The length LW of the anchor area RA in the width direction W is defined by the type of cassette 80 and is equivalent to the length LW of the printing area RP in the width direction W. The length LA of the anchor area RA in the conveying direction Q is shorter than the length LP of the printing area RP. In the present embodiment, the length LA of the anchor area RA is shorter than half the outer circumference M acquired in S2.

Figure 12:
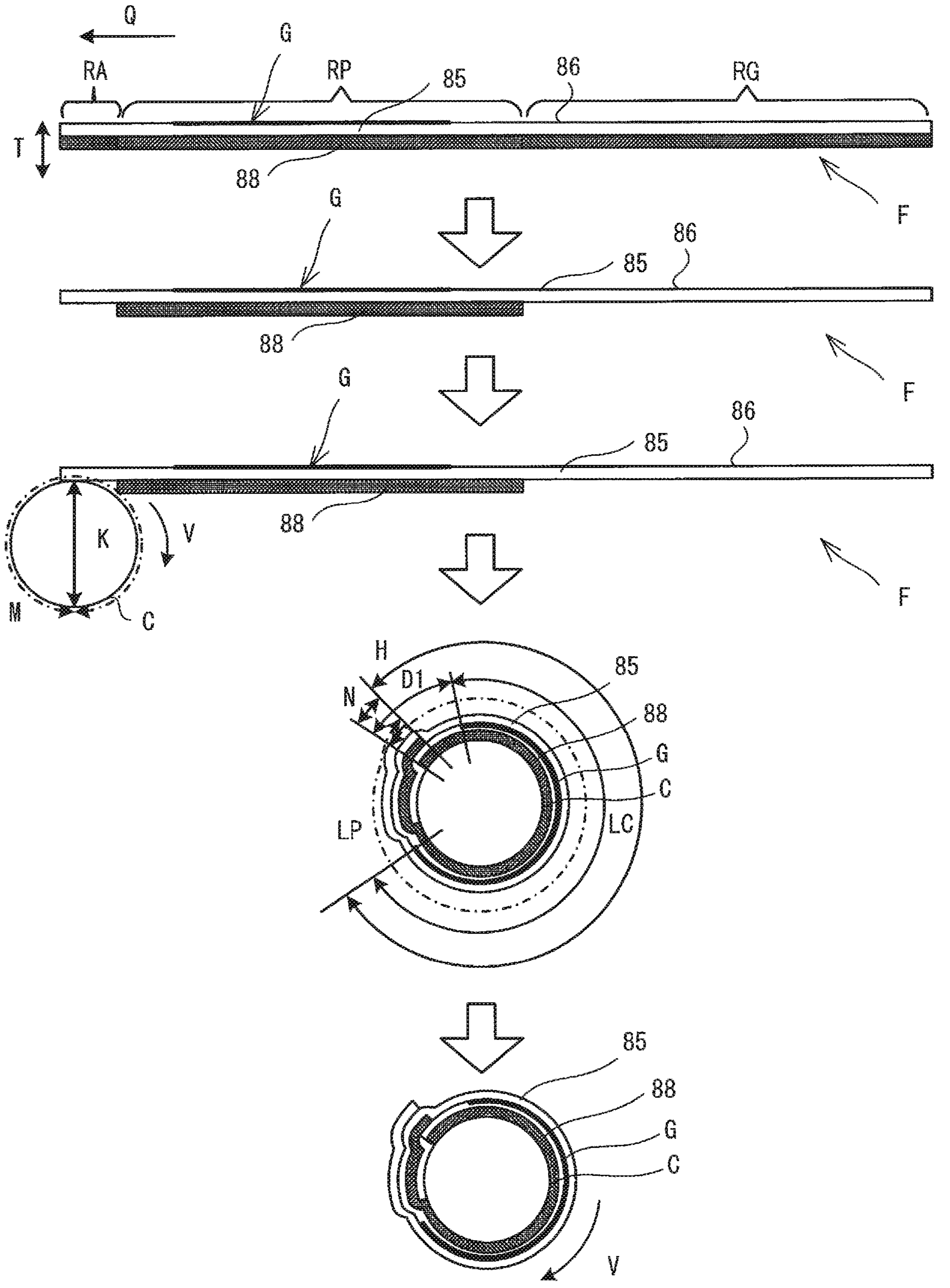
FIG. 12 is an explanatory diagram illustrating an operation wrapping, around a cable, the label shown in FIG. 10 created according to print data.

In S7 the controller 2 sets the adhesive area RG. The adhesive area RG is adjacent to the printing area RP on the other side of the printing area RP in the conveying direction Q. In the present embodiment, the controller 2 does not lay out or print an image in the adhesive area RG. The length LW of the adhesive area RG in the width direction W is defined by the type of cassette 80 and is equivalent to the length LW of the printing area RP in the width direction W. When the cassette 80 is the first cassette type, as shown in FIGS. 10 and 12, the controller 2 sets the length LG of the adhesive area RG in the conveying direction Q to a lamination length. The lamination length is greater than or equal to the sum H of (1) the difference N, which is the value obtained by subtracting the length LP of the printing area RP in the conveying direction Q from the outer circumference M, and (2) the length from the downstream end P1 of the printing area RP in the conveying direction Q to the upstream end P8 of the image G in the conveying direction Q. Since the length LP of the printing area RP in the conveying direction Q is set greater than or equal to the outer circumference M, the difference N is less than or equal to 0. Alternatively, the lamination length may be the length LP of the printing area RP in the conveying direction Q or the outer circumference M.

When a label F having a printing area RP with a length LP equivalent to the outer circumference M of a cable C is wrapped around the cable C, the printing area RP encircles the outer circumference of the cable C so that the upstream end P2 of the printing area RP in the conveying direction Q meets the downstream end P1 of the printing area RP in the conveying direction Q. When a label F having a printing area RP with a length LP greater than the outer circumference M is wrapped around the cable C, both ends of the printing area RP in the conveying direction Q overlap by the length of the difference N.

When a label F having an adhesive area RG with a length LG equivalent to the sum H is wrapped around a cable C, the upstream end P6 of the adhesive area RG in the conveying direction Q overlaps the upstream end P8 of the image G in the conveying direction Q. In other words, the image G printed in the printing area RP is entirely covered by the adhesive area RG. The area between the upstream end P2 of the printing area RP in the conveying direction Q and the upstream end P8 of the image G in the conveying direction Q is not covered by the adhesive area RG. Alternatively, the length LG of the adhesive area RG in the conveying direction Q may be set to the outer circumference M. When a label F having an adhesive area RG with a length LG equivalent to the outer circumference M is wrapped around a cable C, the upstream end P6 of the adhesive area RG in the conveying direction Q overlaps the upstream end P2 of the printing area RP in the conveying direction Q. In other words, the entire printing area RP is covered by the adhesive area RG. The length LG may be set to be larger than or equal to the length LP of the printing area RP.

In S8 the controller 2 sets the first half cut position HC1, as shown in FIG. 10. The first half cut position HC1 is a position at the boundary between the printing area RP set in S5 and the anchor area RA set in S6 at which the controller 2 controls the cutting member 16 to perform a half cut across the tape 81 in width direction W. In S9 the controller 2 sets the second half cut position HC2. The second half cut position HC2 is a position at the boundary between the printing area RP set in S5 and the adhesive area RG set in S7 at which the controller 2 controls the cutting member 16 to perform a half cut across the tape 81 in the width direction W. The controller 2 may also set a cutting depth and cutting direction in S8 and S9. In Example 4, the controller 2 sets the cutting depth to a value obtained by adding a value greater than 0 and less than half the thickness of the base material 85 to the thickness of the release material 88 and sets the cutting direction to the direction from the roller 10 toward the printing member 8. The value less than half the thickness of the base material 85 may be appropriately set based on the type, thickness, and the like of the base material 85, such as 1 μm when the thickness of the base material 85 is 20 μm.

In S10 the controller 2 sets a full cut position FC. The full cut position FC is a position at a downstream end P3 of the anchor area RA in the conveying direction Q or the upstream end P6 of the adhesive area RG in the conveying direction at which the cutting member 16 is controlled to perform a full cut across the tape 81 in the width direction W. In the present embodiment, the controller 2 sets the full cut position FC at the upstream end P6 of the adhesive area RG in the conveying direction Q.

The first half cut position HC1, the second half cut position HC2, and the full cut position FC in the present embodiment are each expressed by a distance from the downstream end P3 of the anchor area RA in the conveying direction Q. Thus, the first half cut position HC1 is expressed as the length LA, the second half cut position HC2 is expressed as the sum of the length LA and the length LP, and the full cut position FC is expressed by a length LT, which is the sum of the lengths LA, LP, and LG.

In S11 the controller 2 generates print data that includes data for printing the image G acquired in S3 in the printing area RP set in S5, the first half cut position HC1 set in S8, the second half cut position HC2 set in S9, and the full cut position FC set in S10.

In Example 5, on the other hand, the controller 2 determines in S4 that the type of the cassette acquired in S1 is not the first type (S4: NO) and in S32 determines whether an execution instruction was detected for executing the same process as the main process including S5 through S11 which is executed when the cassette is the first type. To have the main process executed, the user inputs an execution instruction via the input interface 6. When an execution instruction was detected (S32: YES), the controller 2 executes the main process including S5 through S11 described above.

However, when an execution instruction was not detected (S32: NO), through the processes of S33-S35, the controller 2 sets the printing area RP, the anchor area RA, and the adhesive area RG for a case in which the type of the cassette 90 is the third type, as illustrated in FIG. 11. Specifically, in S33 the controller 2 set the printing area RP as in S5, and arranges the image G acquired in S3 at a prescribed position in the printing area RP. In S34 the controller sets the anchor area RA as in S6.

In S35 the controller 2 sets the adhesive area RG. When the type of cassette detected by the sensor 4 is the third type, which accommodates the tape 93 having a release material 99 affixed to a non-transparent base material 98 via an adhesive layer, the controller 2 sets the length LG of the adhesive area RG in the conveying direction Q to an adhering length. The adhering length is less than or equal to the distance D1 from the downstream end P1 of the printing area RP in the conveying direction Q to the downstream end P7 of the image G in the conveying direction Q. The controller 2 may set the adhering length to a value obtained by adding the difference N to the distance D1. Here, the difference N is less than or equal to 0. When the adhering length is set to a value obtained by adding the difference N to the distance D1, the controller 2 can reliably avoid the image G printed on the printing area RP from being at least partially covered by the adhesive area RG so as to be indiscernible when a label having a non-transparent release material 99 is wrapped around a cable C in the order of the anchor area RA, printing area RP, and adhesive area RG. After the process of S35 is executed, the controller 2 proceeds to S8.

In S8 the controller 2 sets the first half cut position HC1 at the boundary between the printing area RP set in S33 and the anchor area RA set in S34. In S9 the controller 2 sets the second half cut position HC2 at the boundary between the printing area RP set in S33 and the adhesive area RG set in S35. In Example 5, the controller 2 sets the cutting depth to a value obtained by adding, to the thickness of the release material 99, a value greater than the thickness of the base material 91 and smaller than half the thickness of the base material 98, and sets the cutting direction to the direction from the printing member 8 toward the roller 10. The value greater than the thickness of the base material 91 and smaller than half the thickness of the base material 98 is set appropriately based on the type, thickness, and the like of the base material 98.

In S10 the controller 2 sets a full cut position FC to the upstream end P6 in the conveying direction Q of the adhesive area RG set in S35. In S11 the controller 2 generates print data that includes data for printing the image G acquired in S3 in the printing area RP set in S33, the first half cut position HC1 set in S8, the second half cut position HC2 set in S9, and the full cut position FC set in S10.

In S22 the controller 2 determines whether a print instruction was detected. The user inputs a print instruction via the input interface 6 to begin a print based on the print data generated in S11. When a print instruction was not detected (S22: NO), the controller 2 waits until a print instruction is detected. Once a print instruction is detected (S22: YES), in S23 the controller 2 begins driving the conveying member 9 to convey the tape.

In S24 the controller 2 determines whether the tape has arrived at a printing position based on the drive amount of the conveying member 9. When the tape is at the printing position (S24: YES), in S25 the controller 2 drives the printing member 8 according to the print data to print the base material of the tape.

However, when the tape is not at the printing position (S24: NO), in S26 the controller 2 determines whether the tape is in the first half cut position HC1 or the second half cut position HC2 based on the drive amount of the conveying member 9.

When the tape 81 is in the first half cut position HC1 or the second half cut position HC2 in Example 4 (S26: YES), in S27 the controller 2 drives the half cutter 14 of the cutting member 16 an amount corresponding to the cutting depth based on the cutting depth and cutting direction included in the print data to perform a half cut in the tape 81 from the release material 88 side. Through this half cut, the half cutter 14 cuts across the tape 81 in the width direction W, cutting through the release material 88 and partially into the base material 85 in the thickness direction T.

When the tape 100 is at the first half cut position HC1 or the second half cut position HC2 in Example 5 (S26: YES), in S27 the controller 2 drives the half cutter 15 of the cutting member 16 an amount corresponding to the cutting depth based on the cutting depth and cutting direction included in the print data to perform a half cut in the tape 100 from the release material 99 side. Through this half cut, the half cutter 15 cuts across the tape 100 in the width direction W, cutting the release material 99 and base material 98 from the release material 99 side and partially into the base material 91 in the thickness direction T. In the process of S27 for the second half cut position HC2, the controller 2 controls the cutting member 16 to perform a half cut across the tape 100 in the width direction W at the boundary between the printing area RP and the adhesive area RG for cutting into a portion of the base material 91 in the thickness direction T from the release material 99 side, just as in the process of S27 for the first half cut position HC1.

When the tape is not in the first half cut position HC1 or the second half cut position HC2 (S26: NO), in S28 the controller 2 determines whether the tape is in the full cut position FC based on the drive amount of the conveying member 9. When the tape is at the full cut position FC (S28: YES), in S29 the controller 2 drives the full cutter 13 of the cutting member 16 to perform a full cut through the tape. Following S25, S27, or S29 or when the tape is not in the full cut position FC (S28: NO), the controller 2 performs the process in S30.

In S30 the controller 2 determines whether printing was completed. The controller 2 determines that printing was completed when the tape has been conveyed a prescribed amount after the full cut process was performed in S29 based on the drive amount of the conveying member 9. When printing was not completed (S30: NO), the controller 2 returns to S24. Once printing was completed (S30: YES), in S31 the controller 2 halts the drive of the conveying member 9 and ends the printing process described above. Through this printing process, the controller 2 creates the label F shown in FIG. 10 in Example 4, or the label E shown in FIG. 11 in Example 5.

Next, operations for wrapping the self-laminating rotating label F created in the printing process of Example 4 around a cable C will be described with reference to FIG. 12. Using the cuts formed at the half cut positions HC1 and HC2, the user peels off the release material 88 of the label F at the anchor area RA and the adhesive area RG. The user then wraps the label F around the cable C in a wrapping direction V in the order of the anchor area RA, printing area RP, and adhesive area RG, with the width direction W of the label F aligned in the extended direction of the cable C and with the exposed adhesive layer of the label F facing the cable C. The anchor area RA is affixed to the cable C. The printing area RP contacts the cable C and a portion of the anchor area RA. The adhesive area RG is affixed to the printing area RP. The base material 85 in the printing area RP is covered and protected by the base material 85 in the adhesive area RG. Since the base material 85 is transparent, the user can see the image G printed in the printing area RP. The user rotates the label F wrapped around the cable C in the wrapping direction V. Since the base material 85 is partially cut in the thickness direction T between the anchor area RA and the printing area RP, the base material 85 tears easily along this partially cut location, allowing the anchor area RA to separate from the printing area RP and adhesive area RG when the label F is rotated. This separation allows the label F including the printing area RP and adhesive area RG to rotate relative to the cable C. The label F can also move in the extended direction of the cable C relative to the same. The anchor area RA remains fixed to the cable C. However, the user may peel off the anchor area RA from the cable C.

Figure 13:
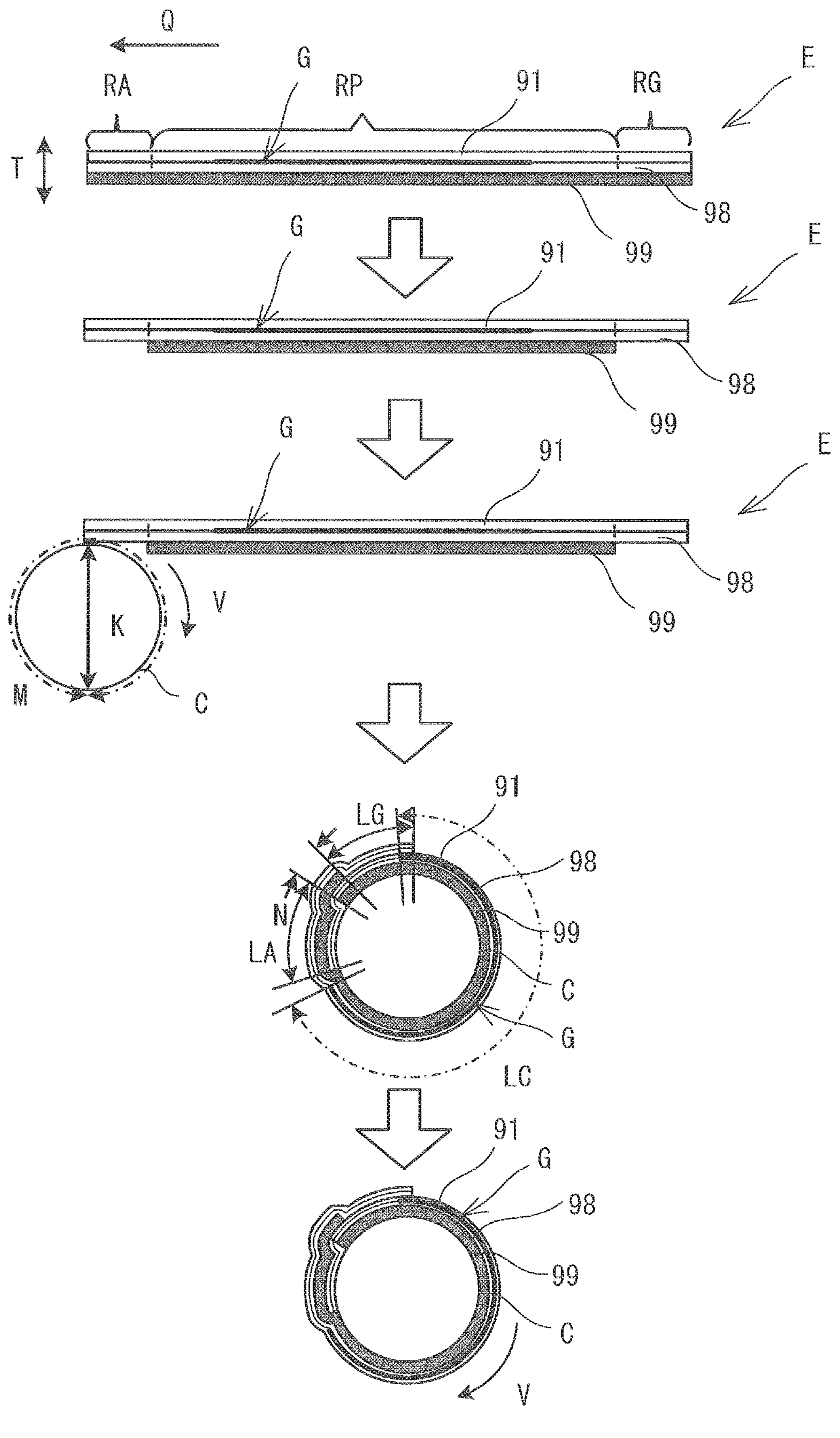
FIG. 13 is an explanatory diagram illustrating an operation wrapping, around a cable, the label shown in FIG. 11 created according to print data.

Next, operations for wrapping the laminated rotating label E created in the printing process of Example 5 around the cable C will be described with reference to FIG. 13. Using the cuts formed at the half cut positions HC1 and HC2, the user peels off the release material 99 of the label E at the anchor area RA and the adhesive area RG. Next, the user wraps the label E around the cable C in the wrapping direction V in the order of the anchor area RA, printing area RP, and adhesive area RG, with the width direction W of the label E aligned in the extended direction of the cable C and with the exposed adhesive layer of the label E facing the cable C. Here, the anchor area RA is first affixed to the cable C. The release material 99 in the printing area RP then contacts the cable C, the anchor area RA, a different portion of the printing area RP. Lastly, the adhesive area RG is affixed to a portion of the printing area RP. Since the printing surface 95 on the base material 91 of the printing area RP is affixed to the base material 98, the printing surface 95 is protected by the base material 91. Since the base material 91 is transparent, the user can see the image G printed in the printing area RP. When the base material 98 is transparent, the release material 99 of the printing area RP serves as the background for the printing area RP. When the base material 98 is non-transparent, the base material 98 forms the background of the printing area RP. The user rotates the label E wrapped around the cable C in the wrapping direction V. Since the base material 91 is partially cut in the thickness direction T between the anchor area RA and the printing area RP, the base material 91 tears easily in this partially cut location, and the anchor area RA separates from the printing area RP and adhesive area RG as the label E is rotated. This separation enables the label E including the printing area RP and adhesive area RG to rotate relative to the cable C. The anchor area RA remains fixed to the cable C, but the user may peel the anchor area RA off the cable C.

In the present embodiment, the printing device 1, the controller 2, the sensor 4, the input interface 6, the printing member 8, the conveying member 9, the cutting member 16, the storage 3, and the cassette mount part 21 are respectively examples of the printing device, the controller, the detector, the input interface, the print head, the conveyer, the cutter, the storage, and the mount part. The process of S2 is an example of the length acquisition process. The process of S3 is an example of the image acquisition process. The processes of S5-S7 and S33-S35 are an example of the area setting process. The process of S25 is an example of the printing process. The process of S27 is an example of the first half cut process and an example of the second half cut process. The process of S29 is an example of the full cut process. The process of S8 is an example of the first half cut setting process. The process of S9 is an example of the second half cut setting process. The process of S10 is an example of the full cut setting process. The process of S11 is an example of the generation process.

In the second embodiment, the printing device 1 is provided with the printing member 8, the conveying member 9, the cutting member 16, and the controller 2. The printing device 1 prints images G on a base material. The conveying member 9 conveys in the conveying direction Q, the tape having a release material bonded to a base material on which the printing member 8 has printed the image G. The cutting member 16 performs half cuts for cutting through the release paper but not the base material, and full cuts for cutting through both the base material and release material.

The controller 2 controls the conveying member 9, the printing member 8, and the cutting member 16. The controller 2 performs the following processes. The controller 2 acquires the outer circumference M of the cable C around which a label cut from the tape is to be wrapped (S2), acquires the image G to be printed in the printing area RP (S3). Based on the acquired outer circumference M, the controller 2 sets a printing area RP with a length LP in the conveying direction Q greater than or equal to the outer circumference M of the cable C, an anchor area RA adjacent to the printing area RP on one side of the printing area RP in the conveying direction Q, and an adhesive area RG adjacent to the printing area RP on the other side of the printing area RP in the conveying direction Q (S5-S7, S33-S35).

Subsequently, the controller 2 performs a printing process by controlling the printing member 8 to print the image G in the printing area RP (S25). Next, the controller 2 controls the cutting member 16 to perform a half cut across the tape in the width direction W at the boundary between the printing area RP and anchor area RA to cut the tape through the release material and into a portion of the base material in the thickness direction T (S27). The controller 2 also controls the cutting member 16 to perform a half cut across the tape in the width direction W at the boundary between the printing area RP and the adhesive area RG to cut at least through the release material in the thickness direction T (S27). The controller 2 also controls the cutting member 16 to perform a full cut across the tape in the width direction W at either the downstream end P3 of the anchor area RA in the conveying direction Q or the upstream end P6 of the adhesive area RG in the conveying direction Q to cut off a label (S29).

Through this process, the printing device 1 can create a label in which the release material has been cut at the boundary between the printing area RP and the anchor area RA and at the boundary between the printing area RP and the adhesive area RG. Using the same tape 81 having the base material 85 and the release material 88, the printing device 1 can create a label F in which the base material 85 can be separated at the first half cut position HC1 and/or the release material 88 can be peeled off from the base material 85 by using the first half cut position HC1. Since the base material 85 is partially cut in the thickness direction T between the anchor area RA and the printing area RP, the base material 85 tears easily at this partially cut location, and the user can separate the anchor area RA from the printing area RP and adhesive area RG by rotating the label wrapped around a cable C while the anchor area RA is affixed to the cable C.

Using the tape 81 having transparent film as the base material 85, for example, the user creates a label F, peels the release material 88 from the base material 85 in the anchor area RA and the adhesive area RG, and wraps the label F around the cable C in the order of the anchor area RA, printing area RP, and adhesive area RG while the release material 88 remains fixed to the base material 85 in the printing area RP. At this time, the anchor area RA is fixed to the cable C. The printing area RP is not fixed to the cable C because the release material 88 remains bonded to the base material 85 in the printing area RP. Further, the adhesive area RG is fixed to the printing area RP. Since the anchor area RA is fixed to the cable C, the position of the label F is fixed relative to the cable C. Accordingly, the user can more easily wrap the printing area RP and the adhesive area RG around the cable C than when the label is not provided with the anchor area RA.

Next, the user rotates the label F wrapped around the cable C in the wrapping direction V. Since the base material 85 is partially cut in the thickness direction T between the anchor area RA and printing area RP, the base material 85 tears easily at the partially cut location, and the anchor area RA separates from the printing area RP and adhesive area RG when the label F is rotated. This separation enables a label F that includes the printing area RP and adhesive area RG to rotate relative to the cable C. Hence, the printing device 1 can create a label F capable of rotating around a cable C when wrapped therearound using the same tape regardless of the outer circumferences M of cables C.

In the process of S27 for the second half cut position HC2, the controller 2 controls the cutting member 16 to perform a half cut across the tape in the width direction W at the boundary between the printing area RP and the adhesive area RG to cut through the release material and into a portion of the base material in the thickness direction T, just as in the process of S27 for the first half cut position HC1. Therefore, when creating a single label, the printing device 1 can cut the tape at the same depth in the thickness direction T both in S27 for the first half cut position HC1 and in S27 for the second half cut position HC2. Accordingly, adjustments in cutting depth in S27 can be simplified compared to a case in which the printing device 1 uses different cutting depths in S27 for the first half cut position HC1 and in S27 for the second half cut position HC2.

In S7 the controller 2 sets the length LG of the adhesive area RG in the conveying direction Q to a lamination length that is greater than or equal to the sum H of (1) the difference N found by subtracting the length LP of the printing area RP in the conveying direction Q from the outer circumference M and (2) the length from the downstream end P1 of the printing area RP in the conveying direction Q to the upstream end P8 of the image G in the conveying direction Q. When a label F created using a tape 81 having transparent film as the base material 85 is wrapped around a cable C in the order of the anchor area RA, printing area RP, and adhesive area RG, the adhesive area RG is affixed to the printing area RP and covers the entire image G printed in the printing area RP, thereby protecting the image G. Therefore, using the same tape, the printing device 1 can create a self-laminating rotating label F capable of rotating when wrapped around a cable C, regardless the outer circumference M of the cable C.

In S7 the controller 2 may set the length LG of the adhesive area RG in the conveying direction Q to a lamination length greater than or equal to the length LP of the printing area RP in the conveying direction Q. When the length LG is greater than or equal to the length LP and a label F having transparent film as the base material 85 is wrapped around a cable C in the order of the anchor area RA, printing area RP, and adhesive area RG, the adhesive area RG covers the entire printing area RP. Hence, the printing device 1 can create a label F in which the image G is reliably covered by the adhesive area RG, regardless of where the image G is laid out in the printing area RP.

The printing device 1 is provided with the cassette mount part 21 in which a cassette accommodating at least a base material is detachably mounted, and the sensor 4 that detects the type of cassette mounted in the cassette mount part 21. When the type of cassette detected by the sensor 4 is the first type, which accommodates a tape 81 having a release material 88 affixed to the back surface 87 of a transparent base material 85 (i.e., the opposite side of the printing surface 86) via an adhesive layer (S4: YES), in the process of S7 the controller 2 sets the length LG of the adhesive area RG in the conveying direction Q to the lamination length. By setting the length LG of the adhesive area RG in the conveying direction Q to the lamination length only when the first cassette type is detected, the printing device 1 can avoid problems that the length LG of the adhesive area RG in the conveying direction Q is set to the lamination length when using tape whose base material is not transparent film. Further, when the label F is wrapped around a cable C, the base material 85 in the adhesive area RG can cover the printing surface 86 of the base material 85 to protect the image G.

The printing device 1 is also provided with the input interface 6. When the controller 2 detects an instruction inputted via the input interface 6, in S7 the controller 2 sets the length LG of the adhesive area RG in the conveying direction Q to the lamination length. By setting the length LG of the adhesive area RG in the conveying direction Q to the lamination length when an instruction is detected, the printing device 1 can enhance user convenience for creating self-laminating rotating labels F.

In the process of S35 the controller 2 sets the length LG of the adhesive area RG in the conveying direction Q to an adhering length that is less than or equal to the length from the downstream end P1 of the printing area RP in the conveying direction Q to the downstream end P7 of the image G in the conveying direction Q. Thus, the printing device 1 can reliably avoid problems that may occur if the adhesive area RG covers at least a portion of the image G in the printing area RP when a label E is wrapped around a cable C.

When the type of cassette detected by the sensor 4 is the third type, which accommodates tape having a release material affixed to a non-transparent base material by an adhesive layer (S4: NO), in the process of S35 the controller 2 sets the length LG of the adhesive area RG in the conveying direction Q to the adhering length (S35). By setting the length LG of the adhesive area RG in the conveying direction Q to the adhering length when the third cassette type is detected, the printing device 1 can reliably avoid problems that the adhesive area RG covers at least a portion of the image G in the printing area RP when a label E is wrapped around a cable C.

While the printing device, print data generation program, and a method for creating labels of the present disclosure have been described in detail with reference to specific embodiments thereof, it would be apparent to those skilled in the art that many modifications and variations may be made therein without departing from the scope of the disclosure. For example, the following modifications may be incorporated as appropriate. The invention may be implemented in various forms, such as a non-transitory computer-readable medium storing the print data generation program, a printing control method executed by the controller 2 of the printing device 1, and the like.

The configuration of the printing device 1 may be modified as needed. For example, at least one of the sensor 4, the communication interface 5, the input interface 6, and the display 7 may be eliminated from the printing device 1. In addition to a touchscreen, the input interface 6 may include a keyboard, a mouse, a joystick, and the like. The printing device 1 may alternatively be provided with just one of the half cutters 14 and 15. The cutting member 16 may be a single cutter capable of executing both half cuts and full cuts.

The program including instructions for executing the process in FIG. 2 should be stored in the storage of the printing device 1 until executed by the controller 2. Therefore, each of the method and route for acquiring the program and the device for storing the program may be modified as needed. Programs executed by the printing device 1 may be received from other devices via a cable or wireless communication and stored in a storage of the printing device 1 or another storage device. Examples of other devices include PCs and servers connected via a network.

In the above examples, the controller 2 executes each step in the printing process, but some or all of the steps may be executed by another electronic device (an ASIC, for example). Alternatively, steps in the printing process may be executed through distributed processing performed by a plurality of electronic devices (a plurality of CPUs, for example). Steps may also be added to or omitted from the printing process, and the order of the steps may be modified as needed. The following modifications may be incorporated in the printing process as appropriate.

The objects around which the labels are wrapped are not limited to cables. Further, the circumference of the objects around which the labels are wrapped may be any shape in addition to circular, such as oval, polygonal, and the like. The labels need not be wrapped around the circumference of objects as their intended use.

The controller 2 may also acquire the image G after setting the printing area RP according to the type of cassette. In the first embodiment, the controller 2 may set at least one of the lengths LA, LP, LL, and LG while accounting for the effects of the label thickness. Similarly, in the second embodiment, the controller 2 may set at least one of the lengths LA, LP, and LG while accounting for the effects of the label thickness.

The one side of the conveying direction Q may instead be the upstream side in the conveying direction Q, while the other side may be the downstream side in the conveying direction Q. In the first embodiment, the cutting depth used in S27 should be a depth in the thickness direction T sufficient to reach part of the base material 85 to which the release material 88 is affixed, while not cutting off the entire tape 81.

In the first embodiment, the printing device 1 may be configured to execute only the process for creating a label F using the first type of cassette 80, while the process from S12 to S21 may be omitted as appropriate. In the second embodiment, the printing device 1 may be configured to execute only one of the processes for creating a label F using the first type of cassette 80 and the process for creating a label E using the third type of cassette 90.

In the first embodiment, in the process for creating a label J using the second type of cassette 90, the printing device 1 may set the full cut position FC to a position upstream from the upstream end P2 of the printing area RP in the conveying direction Q. The printing device 1 may set the full cut position FC to the upstream end P2 of the printing area RP in the conveying direction Q. In the second embodiment, the printing device 1 may create the label F or label E according to the same process, regardless of cassette type.

In the first embodiment, the process from S1 to S21 for generating print data may be executed by the external device B. Similarly, in the second embodiment, the process from S1 to S35 for generating print data may be executed by the external device B. In these cases, the external device B may acquire the cassette type in S1 based on user input, and the printing device 1 may create a label by performing the process from S22 to S31 based on print data generated by the external device B.

The controller 2 need not receive an instruction in the process of S12 (the first embodiment) or S32 (the second embodiment).

In the first embodiment, the length LL of the lamination area RL in the conveying direction Q should be at least the sum H. The controller 2 need not execute the process from S5 to S7 based on a template, and the storage 3 need not store the table 17.

When creating a plurality of labels continuously, the printing device 1 may perform half cuts rather than full cuts between one label and the next label to cut only the base material from the base material side and not the release material. Through this process, the printing device 1 can create a plurality of labels that remain connected by the release material.

In the second embodiment, the storage 3 may store a plurality of templates corresponding to the types of cassettes that are mountable in the printing device 1 and outer circumferences M of cables C on which labels will be attached. Each template may include information specifying the length LW of the label in the width direction W, the length LA of the anchor area RA in the conveying direction Q, the length LP of the printing area RP in the conveying direction Q, and the length LG of the adhesive area RG in the conveying direction Q. The controller 2 may execute at least some of the processes from S5 to S7 and from S33 to S35 by reading a template from the storage 3.

The cutting depth used in S27 may be modified as needed. Cutting depths used for the first half cut position HC1 and the second half cut position HC2 may be the same or different from each other. The cutting depth used in S27 may be set manually and mechanically by the user.

The controller 2 may be configured to lay out and print an image in the anchor area RA.

The above embodiments and their variations may be combined as needed to the extent that they are compatible. For example, the controller 2 may selectively perform the process of S5-S11 shown in FIG. 2 (the first embodiment) to generate the print data for creating the label F shown in FIG. 36, and the process of S5-S11 shown in FIG. 2 (the second embodiment) to generate the print data for creating the label F shown in FIGS. 10 and 12. In this case, the selection of the process may be determined through an user's input operation via the input interface 6.

What is claimed is:

1. A printing device comprising:

a print head configured to print an image on a base material;

a conveyer configured to convey in a conveying direction a tape in which a release material and the base material are bonded together;

a cutter configured to perform: a half cut to cut through the release material but not the base material; and a full cut to cut through both the base material and the release material; and a controller configured to control the print head, the conveyer and the cutter, wherein the controller is configured to further perform, as a main process:

a length acquisition process to acquire an outer circumferential length of an object around which a label cut from the tape is to be wrapped;

an image acquisition process to acquire the image to be printed;

at least one of a first area setting process and a second area setting process, both the first area setting process and the second area setting process setting a printing area, an anchor area, and an adhesive area in the tape on the basis of the acquired outer circumferential length, the image being to be printed in the printing area, the anchor area being next to the printing area on one side in the conveying direction, the adhesive area being next to the printing area on a remaining side in the conveying direction, the one side in the conveying direction being one of an upstream side and a downstream side in the conveying direction, the remaining side in the conveying direction being a remaining one of the upstream side and the downstream side in the conveying direction, wherein in the first area setting process the adhesive area is set to have a length in the conveying direction to be equal to a lamination length, and the lamination length is set to be larger than or equal to a sum of: a difference obtained by subtracting a length of the printing area in the conveying direction from the acquired outer circumferential length; and a length from an end of the printing area on the one side in the conveying direction to an end of the image to be printed on the remaining side in the conveying direction, wherein in the second area setting process the printing area is set to have a length in the conveying direction to be larger than or equal to the acquired outer circumferential length;

a printing process to control the print head and the conveyer to print the image in the printing area;

a first half cut process to control the cutter to perform the half cut to cut across the tape in a width direction thereof at a boundary between the printing area and the anchor area;

a second half cut process to control the cutter to perform the half cut to cut across the tape in the width direction at a boundary between the printing area and the adhesive area; and a full cut process to control the cutter to perform the full cut at one of an end of the anchor area on the one side in the conveying direction and an end of the adhesive area on the remaining side in the conveying direction.

2. The printing device according to claim 1, wherein the cutter includes a half cutter configured to perform the half cut and a full cutter configured to perform the full cut, wherein the controller performs the first half cut process and the second half cut process by controlling the half cutter, wherein the controller performs the full cut process by controlling the full cutter.

3. The printing device according to claim 1, further comprising:

a mount part on which a cassette is mountable, the cassette accommodating the base material; and a detector configured to detect a type of the cassette mounted on the mount part, wherein the controller performs the main process when the detected type of the cassette is a first type cassette that accommodates the tape with the base material being transparent and with the release material affixed to a back surface of the base material via an adhesive layer, the base material having a printing surface opposite the back surface, the image being to be printed on the printing surface.

4. The printing device according to claim 3, wherein the controller is configured to further perform:

a printing area setting process to set the printing area on the basis of the acquired outer circumferential length; and a cut process to perform the full cut at an upstream end of the printing area in the conveying direction or at a position upstream of the upstream end, wherein when the detected type is a second type cassette that accommodates the tape with the release material affixed to a non-transparent second base material via an adhesive layer, the controller performs the printing area setting process, the image acquisition process, the printing process, and the cut process.

5. The printing device according to claim 4, further comprising a storage storing templates each corresponding to both a type of cassette and an outer circumferential length of an object, wherein the controller is configured to further perform:

reading, from among the templates in the storage, a template corresponding to the detected type and the acquired outer circumferential length so that the read template is to be used in the first area setting process and the printing area setting process from among the stored templates.

6. The printing device according to claim 1, further comprising:

an input interface, wherein the controller performs the main process when an instruction to perform the main process is detected via the input interface.

7. The printing device according to claim 1, wherein the length of the printing area in the conveying direction is shorter than or equal to the acquired outer circumferential length.

8. The printing device according to claim 7, wherein the length of the adhesive area in the conveying direction is larger than or equal to the acquired outer circumferential length.

9. The printing device according to claim 1, wherein in the first half cut process, the controller controls the cutter to perform the half cut to cut across the tape in the width direction thereof at the boundary between the printing area and the anchor area to cut through the release material without cutting through the base material in a thickness direction of the tape.

10. The printing device according to claim 9, wherein in the second half cut process, the controller controls the cutter to perform the half cut to cut across the tape in the width direction at the boundary between the printing area and the adhesive area to cut through the release material without cutting through the base material in the thickness direction.

11. The printing device according to claim 1, wherein in the second area setting process, the controller sets the length of the adhesive area in the conveying direction to the lamination length larger than or equal to a sum of: a difference obtained by subtracting the length of the printing area in the conveying direction from the acquired outer circumferential length; and a length from an end of the printing area on the one side in the conveying direction to an end of the image to be printed on the remaining side in the conveying direction.

12. The printing device according to claim 11, further comprising:

a mount part on which a cassette is mountable, the cassette accommodating the base material; and a detector configured to detect a type of the cassette mounted on the mount part, wherein the controller performs the second area setting process to set the length of the adhesive area in the conveying direction to the lamination length when the detected type of the cassette is a first type cassette that accommodates the tape with the base material being transparent and with the release material affixed to a back surface of the base material via an adhesive layer, the base material having a printing surface opposite the back surface, the image being to be printed on the printing surface.

13. The printing device according to claim 11, further comprising:

an input interface, wherein the controller sets the length of the adhesive area in the conveying direction to the lamination length when an instruction to perform the main process is detected via the input interface.

14. The printing device according to claim 1, wherein in the second area setting process, the controller sets the length of the adhesive area in the conveying direction to a lamination length larger than or equal to the length of the printing area in the conveying direction.

15. The printing device according to claim 1, wherein in the second area setting process, the controller is configured to further perform:

setting the length of the adhesive area in the conveying direction to an adhering length less than or equal to a length from the end of the printing area on the one side in the conveying direction to an end of the image on the one side in the conveying direction.

16. The printing device according to claim 15, further comprising:

a mount part on which a cassette is mountable, the cassette accommodating the base material; and a detector configured to detect a type of the cassette mounted on the mount part, wherein in the second area setting process, the controller sets the length of the adhesive area in the conveying direction to the adhering length when the detected type is a second type cassette that accommodates the tape with the release material affixed to a non-transparent second base material via an adhesive layer.

17. A non-transitory computer readable storage medium storing a set of program instructions installed on and executed by a computer for generating print data to be printed in a printing device including: a print head configured to print an image on a base material; a conveyer configured to convey in a conveying direction a tape in which a release material and the base material are bonded together; and a cutter configured to perform: a half cut to cut through the release material but not the base material; and a full cut to cut through both the base material and the release material, the set of program instructions comprising:

a length acquisition process to acquire an outer circumferential length of an object around which a label cut from the tape is to be wrapped;

an image acquisition process to acquire the image to be printed;

at least one of a first area setting process and a second area setting process, both the first area setting process and the second area setting process setting a printing area, an anchor area, and an adhesive area in the tape on the basis of the acquired outer circumferential length, the image being to be printed in the printing area, the anchor area being next to the printing area on one side in the conveying direction, the adhesive area being next to the printing area on a remaining side in the conveying direction, the one side in the conveying direction being one of an upstream side and a downstream side in the conveying direction, the remaining side in the conveying direction being a remaining one of the upstream side and the downstream side in the conveying direction, wherein in the first area setting process the adhesive area is set to have a length in the conveying direction to be equal to a lamination length, and the lamination length is set to be larger than or equal to a sum of: a difference obtained by subtracting a length of the printing area in the conveying direction from the acquired outer circumferential length; and a length from an end of the printing area on the one side in the conveying direction to an end of the image to be printed on the remaining side in the conveying direction, wherein in the second area setting process the printing area is set to have a length in the conveying direction to be larger than or equal to the acquired outer circumferential length;

a first half cut setting process to set a first half cut position to a boundary between the printing area and the anchor area, wherein at the first half cut position the half cut is to be performed to cut across the tape in a width direction thereof;

a second half cut setting process to set a second half cut position to a boundary between the printing area and the adhesive area, wherein at the second half cut position the half cut is to be performed to cut across the tape in the width direction;

a full cut setting process to set a full cut position to one of an end of the anchor area on the one side in the conveying direction and an end of the adhesive area on the remaining side in the conveying direction, wherein at the full cut position the full cut is to be performed; and a generation process to generate the print data including image data to be printed in the printing area, data on the first half cut position, data on the second half cut position, and data on the full cut position.

18. A method comprising:

a length acquisition step to acquire an outer circumferential length of an object around which a label cut from a tape is to be wrapped, the tape having a base material and a release material bonded to the base material;

an image acquisition step to acquire an image to be printed;

at least one of a first area setting step and a second area setting step, both the first area setting step and the second area setting step setting a printing area, an anchor area, and an adhesive area in the tape on the basis of the acquired outer circumferential length, the image being to be printed in the printing area, the anchor area being next to the printing area on one side in a conveying direction, the adhesive area being next to the printing area on a remaining one side of upstream side and downstream side in the conveying direction, the one side in the conveying direction being one of an upstream side and a downstream side in the conveying direction, the remaining side in the conveying direction being a remaining one of the upstream side and the downstream side in the conveying direction, wherein in the first area setting step the adhesive area is set to have a length in the conveying direction to be equal to a lamination length, and the lamination length is set to be larger than or equal to a sum of: a difference obtained by subtracting a length of the printing area in the conveying direction from the acquired outer circumferential length; and a length from an end of the printing area on the one side in the conveying direction to an end of the image to be printed on the remaining side in the conveying direction, wherein in the second area setting step the printing area is set to have a length in the conveying direction to be larger than or equal to the acquired outer circumferential length;

a printing step to print the image in the printing area;

a first half cut step to perform a half cut to cut across the tape in a width direction thereof at a boundary between the printing area and the anchor area to cut through the release material but not the base material;

a second half cut step to perform the half cut to cut across the tape in the width direction at a boundary between the printing area and the adhesive area to cut through the release material but not the base material; and a full cut step to perform a full cut at one of an end of the anchor area on the one side in the conveying direction and an end of the adhesive area on the remaining side in the conveying direction to cut through both the base material and the release material at a position where the full cut is performed.

* * * * *